United States Patent
Yang

(10) Patent No.: US 10,938,750 B2
(45) Date of Patent: *Mar. 2, 2021

(54) CONSENSUS SYSTEM DOWNTIME RECOVERY

(71) Applicant: ADVANCED NEW TECHNOLOGIES CO., LTD., Grand Cayman (KY)

(72) Inventor: Dayi Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,349

(22) Filed: Dec. 22, 2019

(65) Prior Publication Data

US 2020/0127945 A1    Apr. 23, 2020

Related U.S. Application Data

(63) Continuation of application No. 16/494,592, filed as application No. PCT/CN2019/078549 on Mar. 18, 2019.

(51) Int. Cl.
*G06F 11/00* (2006.01)
*H04L 12/939* (2013.01)
(Continued)

(52) U.S. Cl.
CPC .......... *H04L 49/555* (2013.01); *H04L 9/0637* (2013.01); *H04L 12/1854* (2013.01);
(Continued)

(58) Field of Classification Search
CPC .. G06F 11/008; G06F 11/079; G06F 11/3409; G06F 11/3452; G06F 11/3604;
(Continued)

(56) References Cited

U.S. PATENT DOCUMENTS 6,728,958 B1    4/2004    Klein et al.
9,450,852 B1    9/2016    Chen et al.
(Continued)

FOREIGN PATENT DOCUMENTS

CN    108108487 A    6/2018
CN    108108967 A    6/2018
(Continued)

OTHER PUBLICATIONS

Hao Xu et. al., "Dynamic Practical Byzantine Fault Tolerance", 2018 IEEE Conference on Communications and Network Security, IEEE, May 30, 2018 (Year: 2018).*

(Continued)

*Primary Examiner* — Sarai E Butler

(57) ABSTRACT

Methods, systems, and apparatus, including computer programs encoded on computer storage media, for consensus system downtime recovery. One of the methods includes: multicasting a pre-prepare message to at least some of the backup nodes; obtaining (Q-1) or more prepare messages respectively from (Q-1) or more of the backup nodes, wherein the prepare messages each indicate an acceptance of the pre-prepare message by the corresponding backup node; storing the pre-prepare message and the (Q-1) or more prepare messages; multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that the corresponding node agrees to (Q-1) or more prepare messages received by the corresponding node.

20 Claims, 14 Drawing Sheets

(51) Int. Cl.
*H04L 12/18* (2006.01)
*H04L 9/06* (2006.01)
*H04L 12/24* (2006.01)

(52) U.S. Cl.
CPC .......... *H04L 12/1868* (2013.01); *H04L 41/12* (2013.01); *H04L 49/557* (2013.01)

(58) Field of Classification Search
CPC .... G06F 11/0709; G06F 11/00; G06F 11/142; G06F 11/1423; G06F 11/1425; G06F 11/16; G06F 11/20; G06F 11/2005; G06F 11/207; G06F 11/202; G06F 11/2023; G06F 11/2092; H04L 1/0654
USPC .......................................................... 714/37
See application file for complete search history.

(56) References Cited

U.S. PATENT DOCUMENTS

| | | | |
|---|---|---|---|
| 10,158,527 | B2 | 12/2018 | Anderson et al. |
| 2004/0103342 | A1 | 5/2004 | Moser et al. |
| 2005/0089131 | A1* | 4/2005 | Howell ................ G06F 21/725 377/1 |
| 2008/0222159 | A1* | 9/2008 | Aranha ................ G06F 16/21 |
| 2009/0313438 | A1 | 12/2009 | Krishnaprasad et al. |
| 2010/0318786 | A1* | 12/2010 | Douceur .............. H04L 9/3247 713/155 |
| 2012/0011398 | A1 | 1/2012 | Eckhardt et al. |
| 2012/0254412 | A1* | 10/2012 | Goose .................. G06F 9/5072 709/224 |
| 2013/0138614 | A1* | 5/2013 | Travis .................. G06F 16/278 707/658 |
| 2016/0103740 | A1* | 4/2016 | Bogdanov .......... G06F 11/2023 714/19 |
| 2016/0110272 | A1 | 4/2016 | Tracht et al. |
| 2017/0177617 | A1* | 6/2017 | Johnson .............. G06F 11/1474 |
| 2017/0323392 | A1 | 11/2017 | Kasper et al. |
| 2017/0344987 | A1 | 11/2017 | Davis |
| 2018/0247320 | A1 | 8/2018 | Gauld |
| 2018/0285217 | A1 | 10/2018 | Smith et al. |
| 2018/0302222 | A1 | 10/2018 | Agrawal et al. |
| 2018/0307573 | A1 | 10/2018 | Abraham et al. |
| 2018/0329783 | A1* | 11/2018 | Karame ............... H04L 9/3247 |
| 2018/0341930 | A1 | 11/2018 | Moir et al. |
| 2018/0365686 | A1 | 12/2018 | Kondo |
| 2019/0018984 | A1* | 1/2019 | Setty ....................... G06F 21/64 |
| 2019/0020729 | A1 | 1/2019 | Chen et al. |
| 2019/0034465 | A1 | 1/2019 | Shimamura |
| 2019/0036957 | A1 | 1/2019 | Smith et al. |
| 2019/0108518 | A1 | 4/2019 | Asif et al. |
| 2019/0109717 | A1 | 4/2019 | Reddy et al. |
| 2019/0129751 | A1* | 5/2019 | Stanfill ................. G06F 16/27 |
| 2019/0129809 | A1* | 5/2019 | Basu .................. G06F 11/2094 |
| 2019/0179939 | A1 | 6/2019 | Govindarajan et al. |
| 2019/0213333 | A1 | 7/2019 | Williams et al. |
| 2019/0235946 | A1 | 8/2019 | Guo et al. |
| 2019/0244290 | A1* | 8/2019 | Massacci ................ G06F 21/64 |
| 2019/0251187 | A1 | 8/2019 | Lin |
| 2019/0251573 | A1 | 8/2019 | Toyota et al. |
| 2020/0004643 | A1 | 1/2020 | Yang |

FOREIGN PATENT DOCUMENTS

| | | |
|---|---|---|
| CN | 108492103 A | 9/2018 |
| CN | 108616596 A | 10/2018 |
| CN | 109327459 A | 2/2019 |
| CN | 109345386 A | 2/2019 |
| CN | 109347804 A | 2/2019 |
| JP | 2015-146165 A | 8/2015 |
| JP | 2019-29019 A | 2/2019 |
| WO | 2017/204944 A1 | 11/2017 |
| WO | 2018095540 A1 | 5/2018 |
| WO | 2018177264 A1 | 10/2018 |
| WO | 2018194368 A1 | 10/2018 |
| WO | 2018217804 A1 | 11/2018 |
| WO | 2018232493 A1 | 12/2018 |
| WO | 2018232494 A1 | 12/2018 |
| WO | 2019008158 A1 | 1/2019 |
| WO | 2019014531 A1 | 1/2019 |
| WO | 2019/072296 A2 | 4/2019 |
| WO | 2019080235 A1 | 5/2019 |

OTHER PUBLICATIONS

Written Opinion of the International Searching Authority and International Search Report for PCT Application No. PCT/CN2019/078549 dated Aug. 8, 2019 (7 pages).
Castro et al., "Practical Byzantine Fault Tolerance," Proceedings of the Third Symposium on Operating Systems Design and Implementation, New Orleans, USA, Feb. 1999, retrieved from: http://pmg.csail.mit.edu/papers/osdi99.pdf (14 pages).
First Examination Report for Australian Patent Application No. 2019203864 dated Jan. 14, 2020 (9 pages).
Search Report for European Application No. 19725901.3 dated Nov. 27, 2019 (5 pages).
Examination Report for European Application No. 19725901.3 dated Dec. 13, 2019 (11 pages).
First Examination Report for Australian Patent Application No. 2019203865 dated Jan. 14, 2020 (9 pages).
Steen, M. V. et al., 'Distributed Systems', 2018, Third edition, Version 3.02 (596 pages).
Kokoris-Kogias et al., "Enhancing Bitcoin Security and Performance with Strong Consistency via Collective Signing—Middleware 2013," 25th USENIX Security Symposium, Jan. 1, 2013 (19 pages).
Singh et al., "Zeno: Eventually Consistent Byzantine-Fault Tolerance," USENIX, The Advanced Computing Systems Association, Apr. 2, 2009 (16 pages).
Alzahrani et al., "Block-Supply Chain: A New Anti-Counterfeiting Supply Chain Using NFC and Blockchain," Proceedings of the 1st Workshop on Cryptocurrencies and Blockchains for Distributed Systems, Jun. 15, 2018 (7 pages.).
Amiri et al., "ParBlockchain: Leveraging Transaction Parallelism in Permissioned Blockchain Systems," Cornell University Library, Feb. 4, 2019 (11 pages).
Written Opinion of the International Searching Authority and International Search Report for PCT Application No. PCT/CN2019/078552 dated Dec. 23, 2019 (8 pages).
Office Action for Korean Application No. 10-2019-7028753 dated Feb. 7, 2020 (10 pages).
Non-Final Office Action for U.S. Appl. No. 16/724,347 dated Feb. 5, 2020 (10 pages).
Notice of Allowance for U.S. Appl. No. 16/724,347 dated Mar. 20, 2020.
Examination Report for European Application No. 19725897.3 dated May 18, 2020.
Examination Report for European Application No. 19725901.3 dated Apr. 21, 2020.
Hao Xu et al., "Dynamic Practical Byzantine Fault Tolerance", 2018 IEEE Conference on Communications and Network Security, IEEE, May 30, 2018.
Search Report for European Application No. 19725897.3 dated Apr. 23, 2020.
Witten Opinion for Singaporean Application No. 11201908544U dated Jun. 18, 2020.
Written Opinion for Singaporean Application No. 11201908387S dated Jun. 13, 2020.
Notice of Allowance for U.S. Appl. No. 16/724,347 dated Oct. 7, 2020.
Non-Final Office Action for U.S. Appl. No. 16/724,347 dated Jul. 24, 2020.
Office Action for Korean Application No. 10-2019-7028753 dated Aug. 26, 2020.
Examination Report No. 2 for Australian Application No. 2019203865 dated Aug. 24, 2020.
Examination Report No. 2 for Australian Application No. 2019203864 dated Aug. 24, 2020.

(56) References Cited

OTHER PUBLICATIONS

Notice of Allowance for U.S. Appl. No. 16/494,592 dated Dec. 18, 2020.

* cited by examiner

Normal operation protocol

510 ↘

```
511: obtaining a pre-prepare message from the primary node
                            ↓
512: multicasting a prepare message to at least some of the
primary node and the other (N-2) backup nodes, the prepare
message indicating an acceptance of the pre-prepare message
                            ↓
513: obtaining (Q-1) or more prepare messages respectively
from (Q-1) or more of the backup nodes, wherein Q (quorum) is
(N+F+1)/2 rounded up to the nearest integer, and F is (N-1)/3
rounded down to the nearest integer
                            ↓
514: storing the pre-prepare message and the (Q-1) or more
prepare messages
                            ↓
515: multicasting a commit message to at least some of the
primary node and the other backup nodes, the commit message
indicating that the one backup node agrees to the (Q-1) or more
prepare messages
                            ↓
516: obtaining, respectively from Q or more nodes among the
primary node and the backup nodes, Q or more commit
messages each indicating that the corresponding node agrees
to (Q-1) or more prepare messages received by the
corresponding node
```

521: multicasting a pre-prepare message to at least some of the backup nodes

↓

522: obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer

↓

523: storing the pre-prepare message and the (Q-1) or more prepare messages

↓

524: multicasting a commit message to at least some of the backup nodes, the commit message indicating that the primary node agrees to the (Q-1) or more prepare messages

↓

525: obtaining, respectively from Q or more nodes among the primary node and the backup nodes, Q or more commit messages each indicating that the corresponding node agrees to the (Q-1) or more prepare messages received by the corresponding node

FIG. 5B

CONSENSUS SYSTEM DOWNTIME RECOVERY

CROSS REFERENCE TO RELATED APPLICATION

This application is a continuation application of the U.S. patent application Ser. No. 16/494,592 filed on Sep. 16, 2019 and entitled "CONSENSUS SYSTEM DOWNTIME RECOVERY", which is a national phase application of International Application No. PCT/CN2019/078549, filed on Mar. 18, 2019, the contents of which are incorporated by reference in its entirety.

TECHNICAL FIELD

This application generally relates to methods and devices for a consensus system and method, and in particular, to a Practical Byzantine Fault Tolerance (PBFT) consensus system and method.

BACKGROUND

Practical Byzantine Fault Tolerance (PBFT) is a type of consensus mechanism that can be implemented in distributed systems such as blockchain systems. PBFT consensus mechanism enables a distributed system to reach a sufficient consensus with safety and liveness, despite that certain nodes of the system may fail (e.g., due to poor network connection or otherwise becomes faulty) or propagate incorrect information to other peers (e.g., acting maliciously). The objective of such mechanism is to defend against catastrophic system failures by mitigating the influence of the non-functioning nodes on the correct function of the system and on the consensus reached by the functioning nodes (e.g., non-faulty and honest nodes) in the system.

The PBFT consensus mechanism focuses on providing a practical Byzantine state machine replication that tolerates Byzantine faults (e.g., non-functioning nodes) through an assumption that there are independent node failures and manipulated messages propagated by specific and independent nodes. In this PBFT consensus mechanism, for example, all nodes in a blockchain system are ordered in a sequence with one node being the primary node (also known as the leader or master node) and the others referred to as the backup nodes (also known as follower nodes). All of the nodes within the system communicate with each other and the goal is for all honest nodes to come to an agreement/consensus on a state of the system.

For instance, for the PBFT consensus mechanism to work, the assumption is that the amount of non-functioning nodes in a blockchain system cannot simultaneously equal or exceed one third of the overall nodes in the system in a given window of vulnerability. The method effectively provides both liveness and safety as long as at most F nodes are non-functioning nodes at the same time. In other words, in some implementations, the number F of non-functioning nodes that can be tolerated by the PBFT consensus mechanism equals (N-1)/3, rounded down to the nearest integer, wherein N designates the total number of nodes in the system. In some implementations, a blockchain system implementing the PBFT consensus mechanism can handle up to F Byzantine faults where there are at least 3F+1 nodes in total.

The PBFT consensus mechanism generally comprises a normal operation protocol (also known as the triple-stage protocol) and a view change protocol, wherein the normal operation protocol is provided for ensuring the safety of the mechanism, while the view change protocol is provided for ensuring the liveness of the mechanism. The normal stage protocol mainly includes three phases in order, i.e., a Pre-prepare phase, a Prepare phase, and a Commit phase. All phases are message-driven, i.e., a next phase in the protocol is triggered by obtaining a sufficient number of messages in a current phase. The whole process under the normal operation protocol is advanced highly depending on a sufficient number of messages consecutively received at each phase. Even in the view change protocol, the process is advanced on the basis of the prepare messages in the normal operation protocol. Thus, it can be seen, the PBFT consensus mechanism greatly relies on consensus messages to work. If one or more nodes become non-functional (for example, experience downtime and restart), the messages stored in the memory will be lost, affecting the whole consensus process, even incurring inconsistency.

SUMMARY

Various embodiments of the specification include, but are not limited to, systems, methods, and non-transitory computer readable media for consensus system downtime recovery.

According to one embodiment, a computer-implemented consensus method is to be implemented on a blockchain maintained by a number (N) of nodes, wherein one of the nodes acts as a primary node and the other (N-1) nodes act as backup nodes, and the method is performed by the primary node. The method comprises: multicasting a pre-prepare message to at least some of the backup nodes; obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer; storing the pre-prepare message and the (Q-1) or more prepare messages; multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that the corresponding node agrees to (Q-1) or more prepare messages received by the corresponding node. In one embodiment, the Q or more commit messages include the multicast commit message.

In some embodiments, before multicasting the pre-prepare message to at least some of the backup nodes, the method further comprises obtaining one or more transaction requests from at least one of: one or more clients or one or more of the backup nodes.

In other embodiments, the pre-prepare message comprises an order of one or more transactions corresponding to the one or more transaction requests; the commit message indicates that the corresponding node that sent the commit message agrees to the order.

In still other embodiments, the method further comprises packing the one or more transactions into a local copy of the blockchain maintained by the primary node according to the order.

In yet other embodiments, storing the pre-prepare message and the (Q-1) or more prepare messages comprises: storing only the pre-prepare message and the (Q-1) or more prepare messages.

In some embodiments, after multicasting the commit message, the method further comprises: performing a system restart; and loading the stored pre-prepare message and the stored (Q-1) or more prepare messages.

In other embodiments, after storing the pre-prepare message and the (Q-1) or more prepare messages and before multicasting the commit message, the method further comprises: performing a system restart; and loading the stored pre-prepare message and the stored (Q-1) or more prepare messages.

In still other embodiments, up to F of the (Q-1) or more of the backup nodes are non-functioning after multicasting commit messages respectively and do not perform the system restart.

In yet other embodiments, up to all of the N nodes experience a crash; and at least Q of the N nodes perform the system restart and load the corresponding stored pre-prepare message and the stored (Q-1) or more prepare messages respectively In some embodiments, performing the system restart comprises: performing the system restart without triggering a view change.

In other embodiments, a consensus system acting as the primary node for maintaining the blockchain comprises one or more processors and one or more computer-readable memories coupled to the one or more processors and having instructions stored thereon that are executable by the one or more processors to perform the method of any of the preceding embodiments.

In still other embodiments, a consensus apparatus acting as the primary node for maintaining the blockchain comprises a plurality of modules for performing the method of any of the preceding embodiments.

According to another embodiment, a consensus system is for maintaining a blockchain. A number (N) of nodes maintain the blockchain with one of the N nodes acting as a primary node and the other (N-1) nodes acting as backup nodes, the consensus system acting as the primary node and comprising one or more processors and one or more non-transitory computer-readable memories coupled to the one or more processors and configured with instructions executable by the one or more processors to cause the system to perform operations comprising: multicasting a pre-prepare message to at least some of the backup nodes; obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer; storing the pre-prepare message and the (Q-1) or more prepare messages; multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that the corresponding node agrees to (Q-1) or more prepare messages received by the corresponding node.

According to yet another embodiment, a non-transitory computer-readable storage medium is for maintaining a blockchain. A number (N) of nodes maintain the blockchain with one of the N nodes acting as a primary node and the other (N-1) nodes acting as backup nodes, the storage medium being associated with the primary node and configured with instructions executable by one or more processors to cause the one or more processors to perform operations comprising: multicasting a pre-prepare message to at least some of the backup nodes; obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer; storing the pre-prepare message and the (Q-1) or more prepare messages; multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that the corresponding node agrees to (Q-1) or more prepare messages received by the corresponding node.

According to still another embodiment, a consensus apparatus is for maintaining a blockchain. A number (N) of nodes maintain the blockchain with one of the N nodes acting as a primary node and the other (N-1) nodes acting as backup nodes, the consensus apparatus acting as the primary node and comprising: a first multicasting module for multicasting a pre-prepare message to at least some of the backup nodes; a first obtaining module for obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer; a storing module for storing the pre-prepare message and the (Q-1) or more prepare messages; a second multicasting module for multicasting a commit message to at least some of the backup nodes, the commit message indicating that the primary node agrees to the (Q-1) or more prepare messages; and a second obtaining module for obtaining, respectively from Q or more nodes among the primary node and the backup nodes, Q or more commit messages each indicating that the corresponding node agrees to (Q-1) or more prepare messages received by the corresponding node.

Embodiments disclosed in the specification have one or more technical effects. In some embodiments, the methods and systems can ensure that the various nodes of a PBFT consensus system can resume normal operation after one or more of the nodes experience a system crash. In other embodiments, in each round of consensus verification, a node of the consensus system (primary or backup) may store a pre-prepare message and a sufficient number of prepare messages, so that when disruption (e.g., a system-wide crash) occurs, the nodes can resume consensus verification without causing inconsistent consensus results and branching to the blockchain. In still other embodiments, after the crash, the node may perform a system restart and load the stored messages to restore normal functions. System downtime recovery can be expedited by loading the stored messages. In yet other embodiments, the pre-prepare message and at least (Q-1) prepare messages may be stored after obtaining the prepare messages (at the prepare phase of a normal operation protocol) and before multicasting the commit message (at the commit phase of a normal operation protocol). Thus, fewer system resources need to be committed for storage since no more than the pre-prepare message and (Q-1) prepare messages need to be stored to achieve the downtime recovery. In some embodiments, up to F malicious or faulty nodes can be tolerated, without inconsistent consensus results and blockchain branching. That is, the consensus verification determined by the Quorum of the PBFT consensus system is reliable even if up to F nodes cannot be trusted.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 5A illustrates a flow chart of a consensus method, in accordance with various embodiments.

FIG. 5B illustrates a flow chart of a consensus method, in accordance with various embodiments.

DETAILED DESCRIPTION

Embodiments disclosed herein include, but are not limited to, PBFT downtime recovery systems, methods, and non-transitory computer readable media. In various embodiments, a distributed network system such as a blockchain system may comprise a plurality of nodes. The blockchain system may implement a PBFT consensus mechanism, with one of the plurality of nodes designated as a primary node and the other nodes as backup nodes. According to some embodiments, for each round of consensus verification executed in the blockchain system, only a part of the consensus messages, rather than all of them, are stored. For example, a pre-prepare message and a sufficient number of prepare messages during the normal operation protocol are stored. In some embodiments, only the pre-prepare message and (Q-1) prepare messages are stored. Q stands for quorum and is (N+F+1)/2 rounded up to the nearest integer, and F is (N-1)/3 rounded down to the nearest integer. In this way, it is possible to resume and advance the consensus verification process effectively and efficiently from any disruption (e.g., a system-wide crash), with less system storage consumption and without causing inconsistent consensus results and branching to the blockchain. Similar to PBFT, the disclosed systems, methods, and non-transitory computer readable media can be applied to other consensus protocols such as SecureRing, Byzantine Paxos, Q/U, HQ, Zyzzvyva, ABsTRACTs, RBFT, Adapt, Tangaroa, CheapBFT, MinBFT, FastBFT, etc. Various aspects of PBFT can be referred to M. Castro, B. Liskov, "Practical Byzantine Fault Tolerance," Proceedings of the Third Symposium on Operating Systems Design and Implementation, (February 1999), which is incorporated by reference herein in its entirety.

Figure 1:
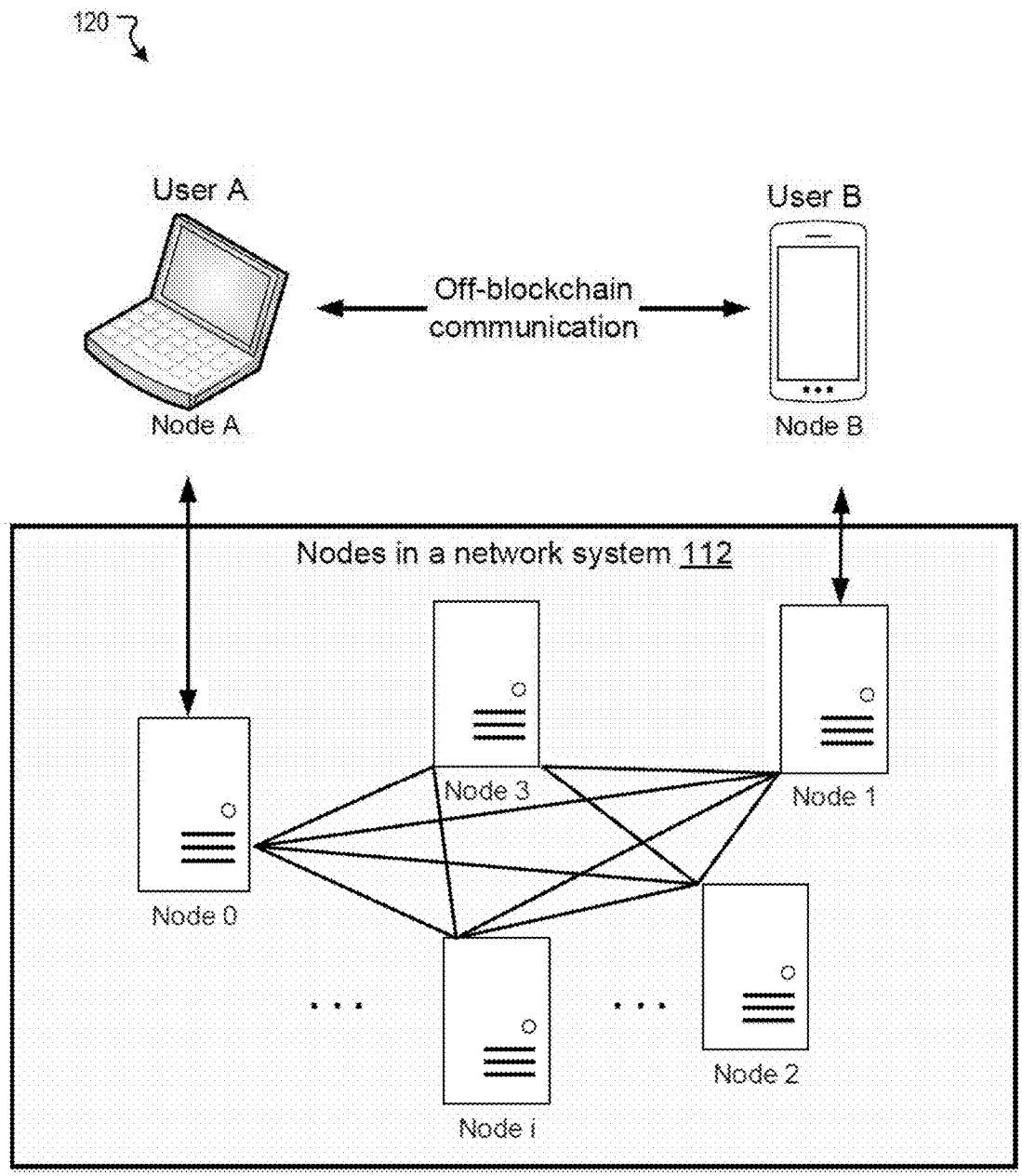
FIG. 1 illustrates a network, in accordance with various embodiments.

FIG. 1 shows a network 120, in accordance with various embodiments. The components presented below are intended to be illustrative. As shown, the network 120 may comprise a distributed network system 112 such as a blockchain system. The network system 112 may comprise one or more nodes (e.g., Node 0, Node 1, Node 2, Node 3, Node 4 . . . Node i, . . . , etc.) implemented in one or more computing devices such as servers, computers, mobile phones, etc. The network system 112 may be installed with appropriate software (e.g., consensus program) and/or hardware (e.g., wires, wireless connections) to access other devices of the network 120 or additional systems. Each node may include one or more processors and one or more memories coupled to the one or more processors. For example, the one or more memories are non-transitory and computer-readable, and are configured with instructions executable by one or more processors to cause the one or more processors to perform operations described herein. Although the nodes are shown as single components in this figure, it will be appreciated that these nodes can be implemented as single devices or multiple devices coupled together. In general, nodes may be able to communicate with one another and other devices outside the network system 112. For example, through one or more wired or wireless networks (e.g., the Internet), data can be communicated.

In various embodiments, the network system 112 may be implemented as a blockchain system comprising a plurality of nodes. For example, as shown in FIG. 1, the blockchain system comprises a plurality of blockchain nodes (e.g., Node 0, Node 1, Node 2, Node 3, Node 4, . . . node i, . . . etc.). The nodes may form a network (e.g., peer-to-peer network), with one blockchain node communicating with another. The order and the number of the blockchain nodes as shown are merely examples and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, the blockchain system may interact with other systems and devices such as node A and node B (e.g., lightweight nodes). The interactions may involve transmission and reception of data for the purpose of, for instance, receiving a request and return an execution result of the request. In one example, user A may want to transact with user B over the blockchain. The transaction may involve transferring some asset in user A's account to user B's account. User A and user B may use respective devices node A and node B installed with an appropriate blockchain software (e.g., cryptocurrency wallet) for the transaction. Node A may access the blockchain through communication with Node 0, and node B may access the blockchain through communication with Node 1. For example, Node A may submit a transaction request to the blockchain through Node 0, and Node B may submit a smart contract execution request to the blockchain through Node 1. Off the blockchain, node A and node B may have other channels of communication (e.g., regular internet communication without going through Nodes 0 and 1).

The blockchain nodes may each comprise or couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as nodes A and B operated by users.

The blockchain nodes form a network (e.g., P2P network) that, through consensus, records transactions in a distributed ledger known as blockchain. The participants of a P2P network may be referred to as nodes, which maintain the blockchain. In a blockchain P2P network, each node participates in consensus verifications and stores a complete ledger copy of the blockchain. Every node confirms batches of transactions by a blockchain consensus algorithm to ensure that all nodes have consistent confirmation results and thus consistent copies of the blockchain.

One of the blockchain consensus algorithms is Practical Byzantine Fault Tolerance (PBFT). Byzantine fault tolerance originates from the Byzantine general problem. For a P2P network system, as long as the number of non-functioning nodes is within a certain limit, the system can continue functioning properly. Such system is called Byzantine fault tolerant system. PBFT is an example of an optimization of the Byzantine Fault Tolerance network ability. PBFT provides the network with a Byzantine state machine, by copying servers and synchronizing client interactions with server copies.

At the center of the PBFT operation is the maintenance of the consistent global view of the information recorded on the blockchain, which forms the backbone for enabling users to interact with each other in a decentralized manner. The safety of the PBFT consensus mechanism is critical to a blockchain system. The two key properties of a consensus model are: 1) safety or consistency: all honest nodes produce the same valid output; and 2) liveness: all honest nodes in consensus eventually produce a value without being stalled at an intermediate step. A secure and robust PBFT consensus mechanism needs to tolerate a wide variety of Byzantine behaviors, including failures of nodes, partition of the network, message delay, out-of-order message delivery, message corruption, and the like and reach consensus in nodes as long as the number of non-functioning nodes within the system is limited. To that end, the PBFT model works under either one of two mutually exclusive protocols: normal operation/consistency protocol and view change protocol that are further described below. In this specification, non-functioning means faulty and/or malicious, and functioning means non-faulty and honest. Possible faulty and/or malicious acts may include: failure to delivery message, message delivery delay, out-of-order message delivery, Byzantine faults (delivering arbitrary messages to different nodes, violating the protocol), etc.

In some embodiments, a blockchain system implementing the Practical Byzantine Fault Tolerance (PBFT) mechanism may comprise a total number of N nodes, with one of the N nodes acting as a primary node and the other of the N nodes acting as backup nodes. The primary node designation may not be fixed to a particular node, as another node may be elected to become a new primary node through the view change protocol. For example, the primary node may be elected through a modulo operation, in which a functioning node with the lowest serial number (modulo view number) becomes the new primary node. The current view and the total number of nodes N may determine the primary node id=(view+1) mod N. In PBFT, the view is changed each time a new primary node is elected. For example, with each view change, the view increases monotonically from zero. That is, the view may change with a change in the primary node.

In some embodiments, the primary node is functioning at view v, and the normal operation protocol is executed. For the normal operation, the primary node and/or the backup nodes may receive requests associated with unverified transactions from one or more clients. For example, node A as a client may submit a request to the primary node and/or the backup nodes. The request may include an unverified transaction (e.g., a transaction to be added to a new block in blockchain by consensus verification). The unverified transactions may include, for example, blockchain-based financial transactions, smart contract deployment or execution transactions, etc. The primary and backup nodes may or may not perform some preliminary verification of the transactions. The backup nodes that receive the requests may forward the received requests to the primary node. Once the requests with unverified transactions at the primary node reach a certain level or otherwise meets a triggering condition, the primary node may initiate a round of consensus verification and propose a verification result for the unverified transactions. The backup nodes may respond to the consensus and confirm the proposal to reach a consensus. The requirements for the nodes are that they are deterministic and start in the same state. The final result is that all honest nodes come to a consensus on the order of the record and they either accept it or reject it. Once consensus-verified, the transactions may be packed into a new block of the blockchain and added to the local blockchain copies maintained by the nodes. Also, the clients (e.g., node A) that originally sent the requests are notified.

Figure 2A:
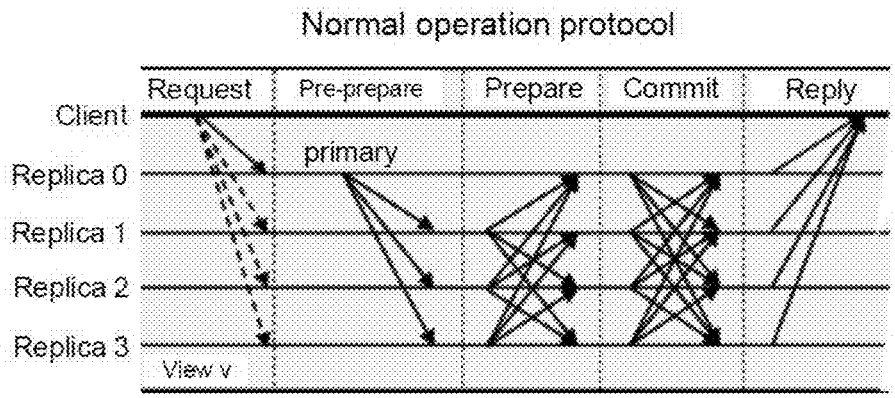
FIG. 2A illustrates a normal operation protocol of PBFT.
Figure 2B:
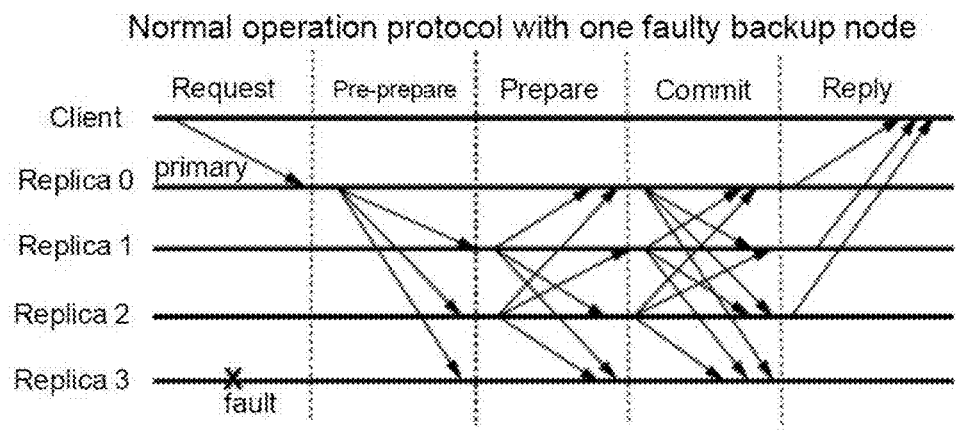
FIG. 2B illustrates a normal operation protocol of PBFT with one faulty replica.
Figure 2C:
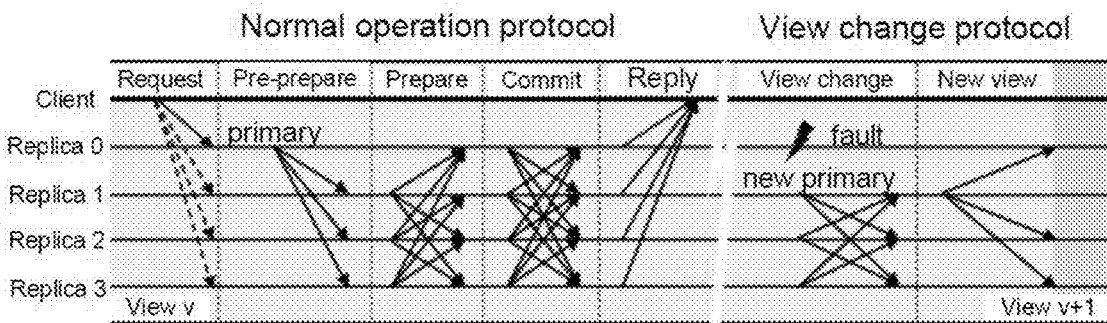
FIG. 2C illustrates a normal operation protocol and a view change protocol of PBFT.

As indicated above, to preserve safety, the PBFT consensus mechanism mainly comprises three phases for the normal operation protocol: a Pre-prepare phase, a Prepare phase, and a Commit phase. Referring to FIG. 2A to FIG. 2C, an example of a blockchain system implementing the PBFT consensus mechanism comprises four replicas (replica being another term for node): Replica 0, Replica 1, Replica 2, and Replica 3. The numbers 0 to 3 are replica serial numbers that may be used to determine a new primary node. Replica 0 may correspond to primary node 0, and Replicas 1, 2, and 3 may correspond to backup nodes 1, 2, and 3. The replicas may be implemented, for example, in corresponding nodes of the network system 112 described above. A normal operation protocol is shown in FIG. 2A with no non-functioning node present, and another normal operation protocol is shown in FIG. 2B with Replica 3 being a non-functioning node. For both situations, the normal operation protocol may further comprise two phases: a Request phase and a Reply phase, in addition to the Pre-prepare phase, the Prepare phase, and the Commit phase. A flow chart of steps corresponding to FIG. 2A is shown in FIG. 3A.

Figure 3A:
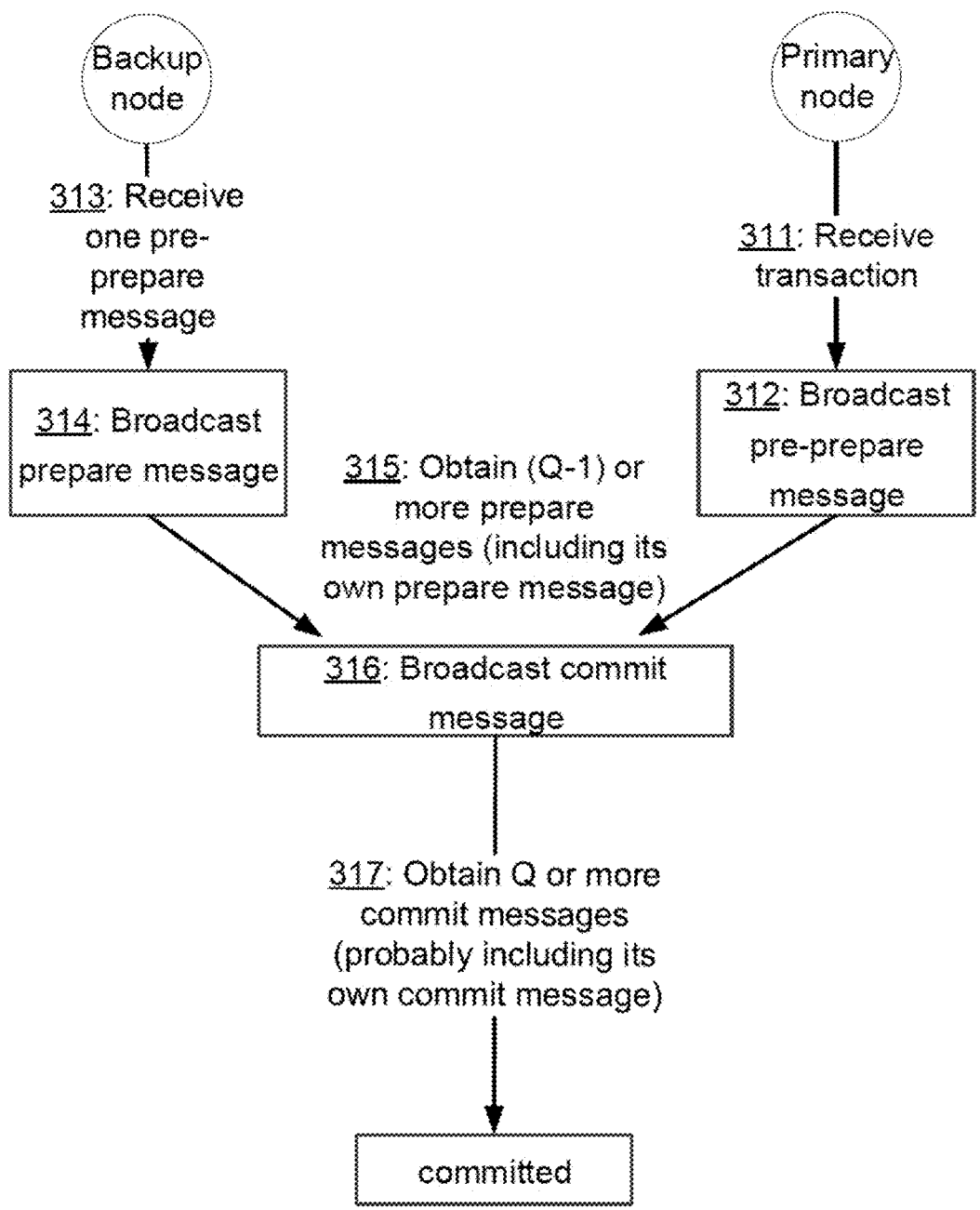
FIG. 3A illustrates a flow chart of steps of a normal operation protocol of PBFT.

Referring to FIG. 2A, FIG. 2B, and FIG. 3A, the normal operation protocol begins in the Request phase when a client submits a request (message) to the primary node (Replica 0), which is responsible for advocating for the request. The request may comprise information of the client, a request operation (e.g., one or more transactions for consensus verification), and a request timestamp. The client (also referred to as a client node) may be implemented, for example, in node A described above. Node A may be a lightweight node (e.g., implemented in a mobile phone). Additionally or alternatively, the client may submit the request to a backup node, which forwards the request to the primary node before the Pre-prepare phase. Regardless whether the primary or backup node receives the request, the corresponding node may multicast the received request to the other nodes in the network. Thus, the primary node may end up obtaining the pending requests submitted by the clients to the consensus network one way or another (step 311).

Accordingly, the primary node acts like a leader and leads the backup nodes to verify the transaction/transactions associated with request. The primary node is responsible for ordering execution of requests within its view. In the Pre-prepare phase, the primary node may obtain a plurality of requests, validate the obtained requests, and propose a sequence number for each of the requests. Thus, the requests may each be assigned an increasing sequence number and thus put in order. Additionally, the pre-prepare message may comprise a block height. The block height may be based on a current height of the blockchain. For example, if the blockchain currently has 1000 blocks, the block height may be 1000 indicating that 1000 blocks already exist in the blockchain, or may be 1001 indicating that the transaction/transactions associated with the request are proposed to be packed into the 1001th block of the blockchain, which is yet to be verified by other nodes. The primary node may forward a client's request along with the corresponding sequence number and/or the block height. For example, after obtaining the requests, the primary node may arrange the requests in an order for executing the corresponding transactions by assigning the sequence numbers and store to a list. The primary node may send a pre-prepare message to every backup node (Replica 1 to Replica 3) in the blockchain system (step 312). As shown in FIG. 2A, the primary node may multicast the list in or along with the pre-prepare message to the backup nodes. As shown in FIG. 2B, even if a backup node (Replica 3) is non-functioning and the primary node is unaware of it, the primary node may still send the pre-prepare message (step 313). Each backup node accepts the pre-prepare message so long as it is valid. The pre-prepare message may contain a view number, a sequence number, a signature by the primary node, a digest (d), other meta data, and the like, which allow determination of the validity of the pre-prepare message.

In the Prepare phase, if a backup node accepts the pre-prepare message, it may follow up by multicasting a prepare message to other nodes in the blockchain system including the primary node (step 314). Multicasting the prepare message indicates that the sender node agrees to the pre-prepare message. Each prepare message is accepted by the receiving node as long as being valid. The validity of the prepare message can be similarly determined based on the view number, the sequence number, the signature of the corresponding backup node, a digest (d), other meta data, and the like. A backup node is prepared, if it has received a valid pre-prepare message from the primary node, and has obtained (Q-1) or more distinct, valid, and consistent prepare messages from other nodes (step 315), wherein Quorum (Q) designates the number of replicas/nodes required to ensure all replica/node data consistency and fault tolerance requirements. In some embodiments, the blockchain system implementing the PBFT system has a number of at least 3F+1 replicas/nodes, wherein F designates the number of Byzantine faults/non-functioning nodes that the PBFT can tolerate to work with safety and liveness, and Quorum (Q) equals 2F+1. In this case, a pre-prepare message and at least 2F messages can be stored. The 2F prepare message may include the multicast prepare message. Here, Q-1 (in this case, 2F) instead of Q prepare messages are needed because the pre-prepare message can be treated as an equivalent of a prepare message of the primary node (although the primary node may not send the prepare message per se). If counting the pre-prepare message as one more prepare message, then there would be at least Q (e.g., 2F+1) distinct and valid prepare messages indicating that at least Q (e.g., 2F+1) of all nodes accepted the pre-prepare message, of which up to F non-functioning nodes can be tolerated. Thus, the pre-prepare to prepare phase ensures that at least F+1 functioning nodes (2F+1 prepared nodes but accounting for up to F non-functioning nodes) agree that if a request is executed in view v, it will be executed with its sequence number. The prepare phase ensures fault-tolerant consistent ordering of each request within views.

In some embodiments, after receiving the pre-prepare message and (Q-1) prepare messages, the backup node may verify the order and compare the verification result with a proposed verification result written by the primary node in the pre-prepare message. There may be a number of ways to verify the order. For example, the proposed verification result may comprise a proposed Merkle Patricia Trie root written into the digest (d). The backup node may arrange the transactions associated with the requests according to the order and compute a Merkle Patricia Trie root to compare with the proposed Merkle Patricia Trie root. The computation may also require certain existing information such as node hash of existing blocks in the blockchain. The comparison yields a digest (D(m)) calculated by the backup node. If the digest (D(m)) is consistent with the digest (d), the verification succeeds. Once verified, the backup node may agree to the ordering of the requests (e.g., the order for packing the transactions associated with the requests into a new block of the blockchain). Similarly, the backup node may verify if the commit messages (described below with respect to the commit phase) it receives comprise the same digest D(m) to determine if other nodes also agree to the ordering of the requests. If a prepared node has obtained Q (e.g., 2F+1) commit messages and all requests with lower sequence numbers have been executed, the node may execute the request.

In some embodiments, the pre-prepare message may comprise a digest (d) of the new block or information otherwise related to executing the requests (e.g., transactions associated with the requests). The digest (d) (e.g., a hash value) may be the numeric result of applying a hash algorithm to the data such as the transactions. The backup node may execute the transactions to confirm the digest (d). For a plurality of requests, the backup node may execute the requests according to the order (that is, the sequence numbers of the requests) to obtain a digest D(m). If D(m) and d are consistent, the backup node multicasts a commit message (described below with respect to the commit phase) which indicates that backup node agrees with the validation result of the primary node. For a pending request of a certain sequence number, if a prepared node has obtained Q (e.g., 2F+1) commit messages and all requests with lower sequence numbers have been executed, the node may execute the request.

In the Commit phase, if a node is prepared, it may multicast a commit message to other nodes (step 316). The node may receive commit messages from other nodes. Each node accepts the commit message so long as it is valid. The commit message may contain a view number, a sequence number, a signature, a digest, other meta data, and the like, which allow determination of the validity of the message. In some embodiments, if a node has obtained at least Q distinct, valid, and consistent commit messages, it indicates that a quorum of nodes have committed (that is, at least (Q-F) honest nodes are prepared) and consensus has been reached (step 317). The at least Q valid commit messages may include the multicast commit message. Thus, the prepare to commit phase ensures that at least (Q-F) functioning nodes agree (Q commit messages but accounting for up to F non-functioning nodes) that a request will be eventually executed in view v with its sequence number. Since the nodes may commit in different views (e.g., when some nodes have already entered a new view and some other nodes remain in the previous view), the commit messages received may correspond to commits performed in different views. The commit phase ensures fault-tolerant consistent ordering of each request across views as functioning nodes agree on the sequence number of the each request.

In some embodiments, if a node has obtained at least Q distinct, valid, and consistent commit messages, the node may execute the corresponding request(s). For example, once Q commit messages have been obtained, it means that the new block is consensus-verified. Thus, the node may pack the new block into the locally maintained copy of blockchain. Otherwise, the backup node may directly trigger the view change protocol.

In the reply phase, after the execution of the request(s), the node sends out a reply message directly to the client. For a transaction packed into the blockchain, the reply message may comprise an address of the transaction in the blockchain. Because up to F faults are allowed, the client waits for (Q-F) replies with valid signatures from different nodes and with the same request timestamp and the same result of execution before accepting the result. For the PBFT network system shown in FIG. 2A and FIG. 2B, there are four total nodes, so at most one (F=1) non-functioning node can be tolerated. Thus, even with Replica 3 being non-functioning, the consensus can still be reached in FIG. 2B.

To preserve liveness, the primary node can be replaced in a view change protocol if a specific amount of time has passed without the primary node multicasting the request. For example, the backup node may maintain a timer. The backup node starts the timer when it receives a request and the timer is not already running. The backup node stops the timer when it is no longer waiting to execute the request (i.e., the request is executed), but restarts the timer if at that point it is waiting to execute one or more other requests. If the timer expires, the backup node may determine that the primary node is non-functioning. Thus, the backup node may multicast a view change message to other nodes. For another example, the backup node may determine that the primary node is malicious. Thus, the backup node may multicast a view change message. For another example, the client may use a timer to determine if too much time has passed after client sends the request to the primary node without receiving a response. When this timer expires, the client sends its request to all nodes. If a node already knows about the request, the rebroadcast is ignored. If the node does not know about the request, it will start a timer. On timeout of the node's timer, the node starts the view change process by multicasting the view change message to other backup nodes based on the suspicion that the primary node is faulty (step 321). The view change message includes the system state (in the form of archived messages including the prepare message of its own during the previous normal operation), so that other nodes will know that the sender node has not failed.

Figure 3B:
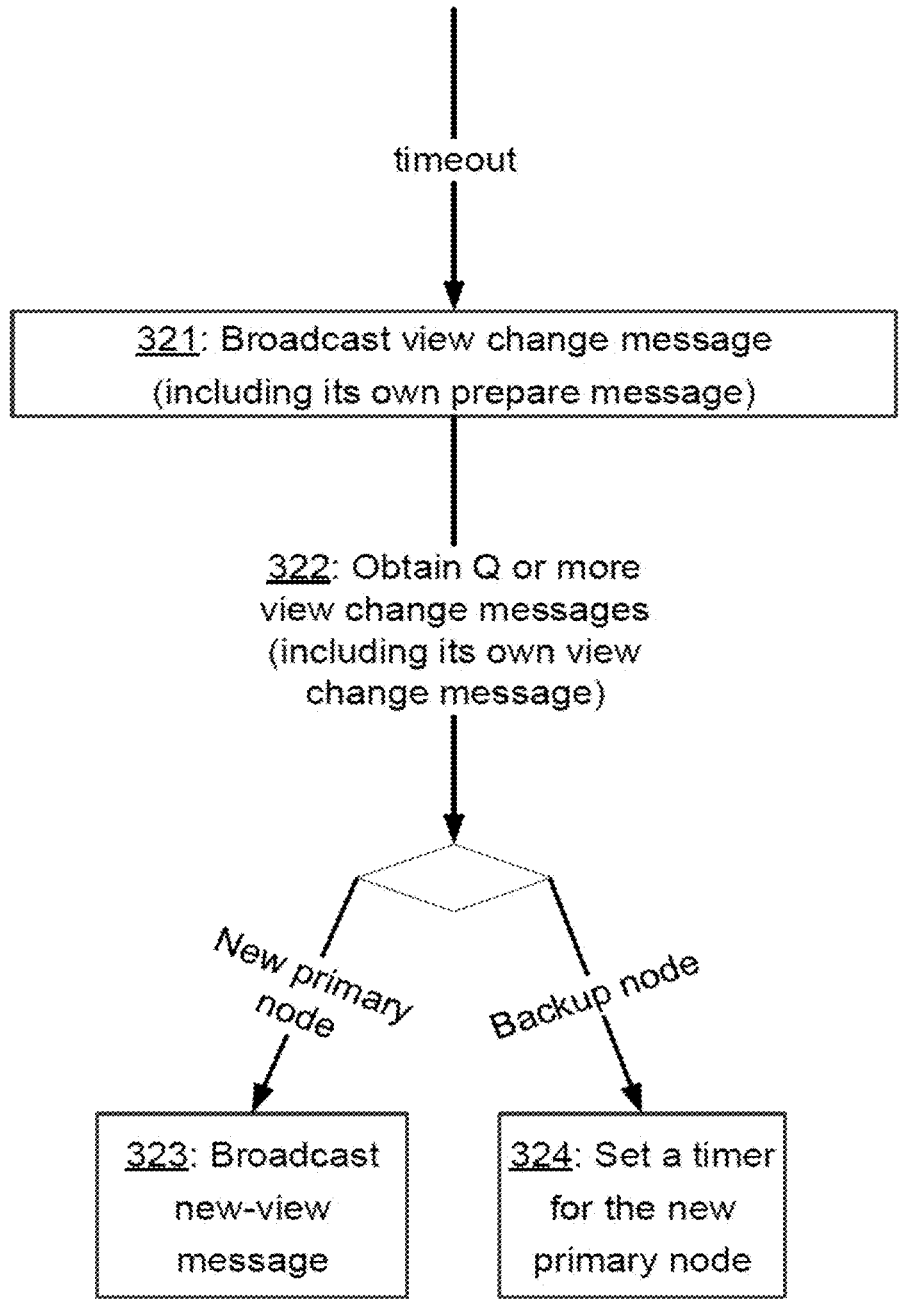
FIG. 3B illustrates a flow chart of steps of a view change protocol of PBFT.

A supermajority of functioning nodes can decide whether a primary node is non-functioning and remove it with the next primary node in line as the replacement. View change occurs when enough nodes believe that the primary node has failed. A portion of FIG. 2C shows the view change protocol, and a flow chart of steps corresponding to the view change protocol is shown in FIG. 3B. Referring to FIG. 2C and FIG. 3B, under the view change phase, if the current view is v, node p=(v+1) mod N waits for obtaining Q valid view change messages to become the new primary node, where p is the replica/node serial number, v is the view number, N is the total number of replicas/nodes (step 322). The Q view change messages may include the multicast view change message. Since the previous view is v, the view change messages may each comprise a new view v+1. Once new primary node p has obtained Q view change messages, it multicasts a new view message (step 323). This message contains all the valid view change messages received as well as a set of all requests that may not have been completed yet due to primary node failure. The new primary node may decide on the latest checkpoint and ensure, among other things, that non-faulty nodes are caught up with the latest states, which may involve re-committing previous requests (e.g., prepared, committed, but not executed requests) in the new view. While the view change is occurring, no new requests are accepted. After a node receives a valid new view message including the Q view change messages, it enters view v+1 and processes the set of uncompleted requests. Thereafter, the normal operation protocol proceeds, and the nodes redo the requests between the sequence number of the latest stable checkpoint and the highest number in a prepare message, but avoid re-executing requests. The backup nodes may set a timer for the new primary node (step 324).

Figure 3C:
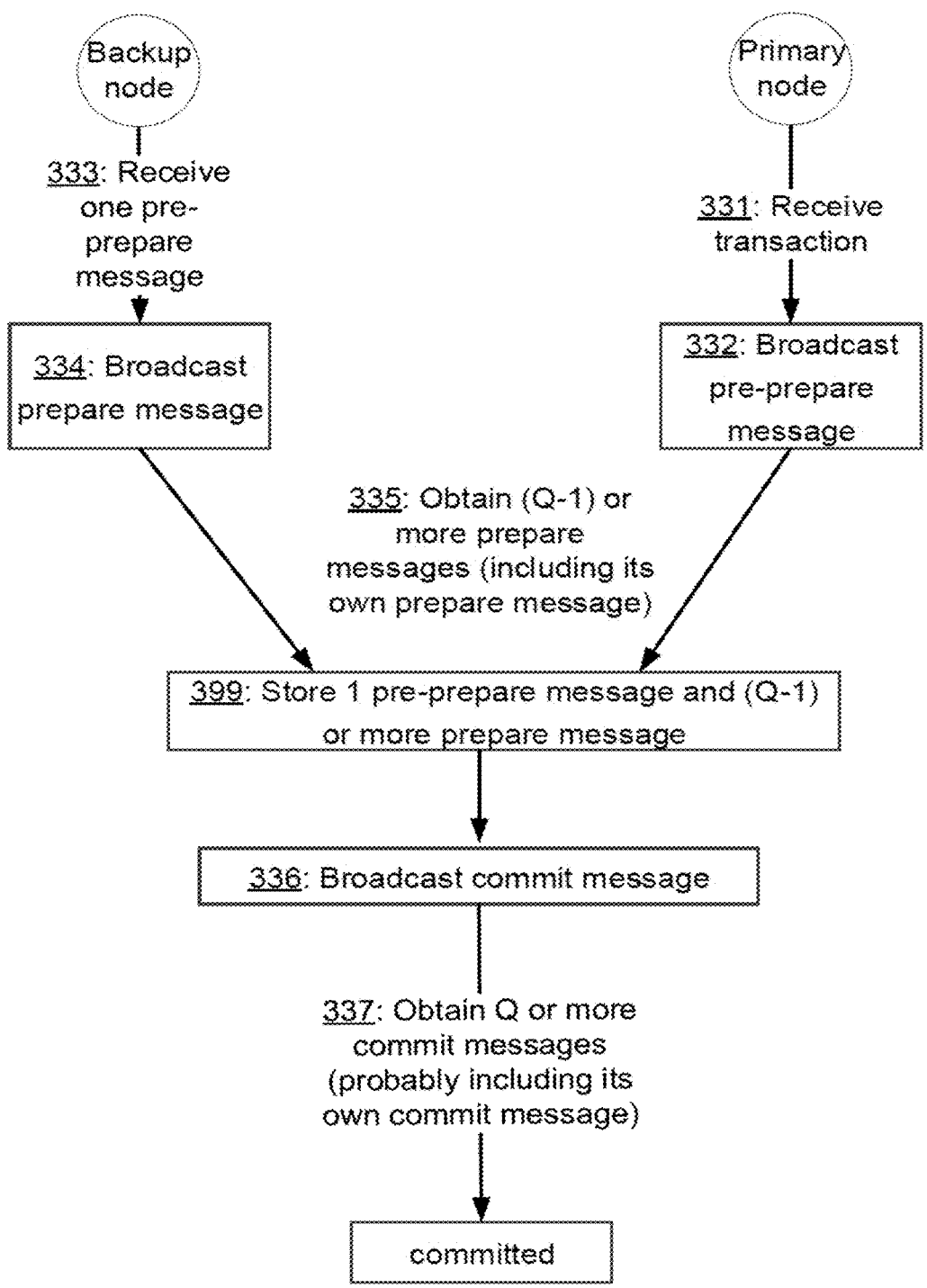
FIG. 3C illustrates a flow chart of steps of a normal operation protocol of a consensus system, in accordance with various embodiments.

FIG. 3C is similar to FIG. 3B, except for an addition of a Storage phase. That is, steps 331-337 are similar to steps 311-317 respectively, except that step 399 is additionally performed between steps 335 and 336. In some embodiments, as shown in FIG. 3C, between the Prepare phase (backup or primary node obtains the (Q-1) prepare messages) and the Commit phase (backup or primary node multicasts the commit message), the pre-prepare message and at least (Q-1) prepare messages may be stored in the Storage phase. Further details are described below with reference to FIG. 4A to FIG. 6B.

Figure 4A:
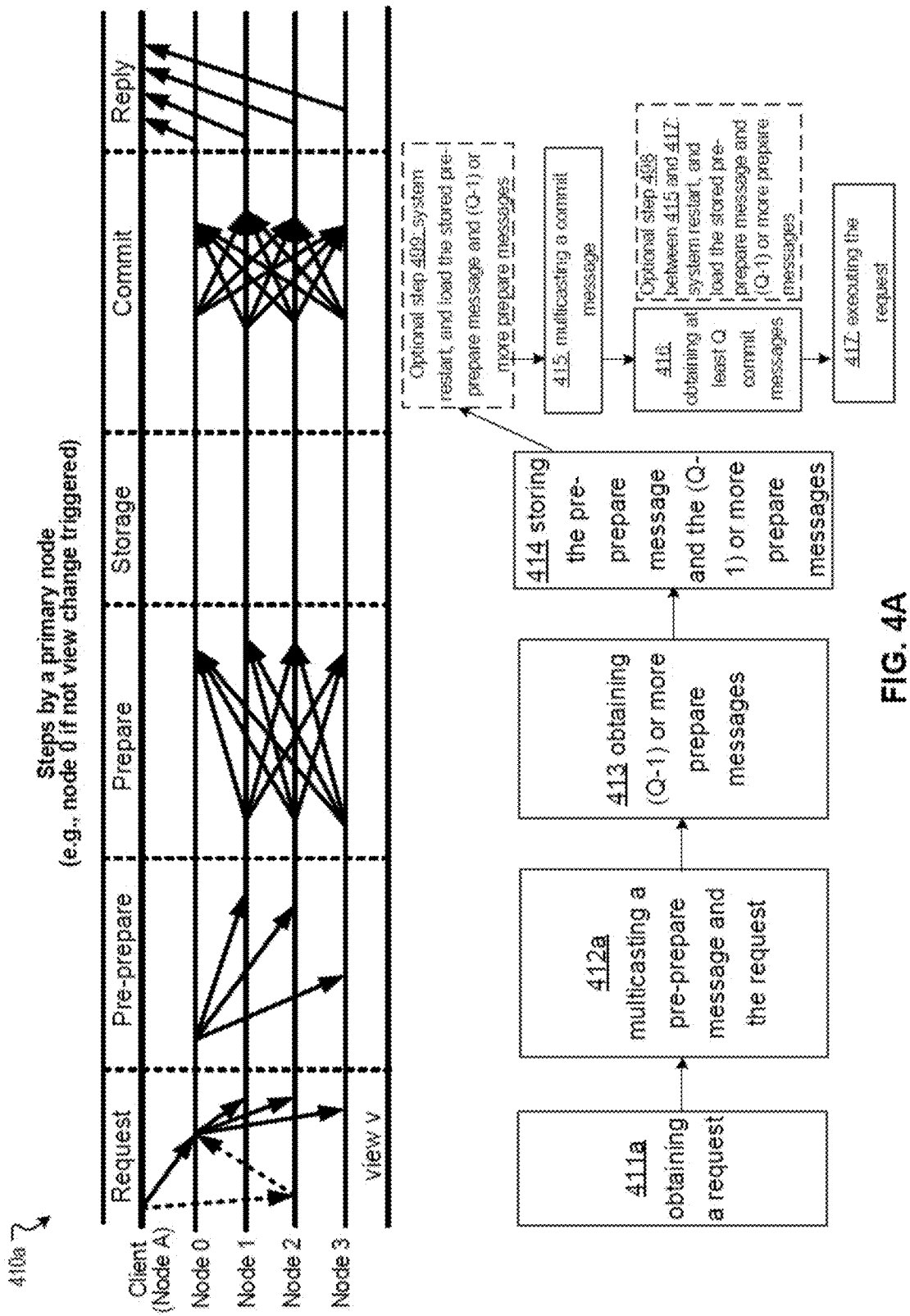
FIG. 4A-FIG. 4D each illustrates a flow chart of consensus steps, in accordance with various embodiments.
Figure 4B:
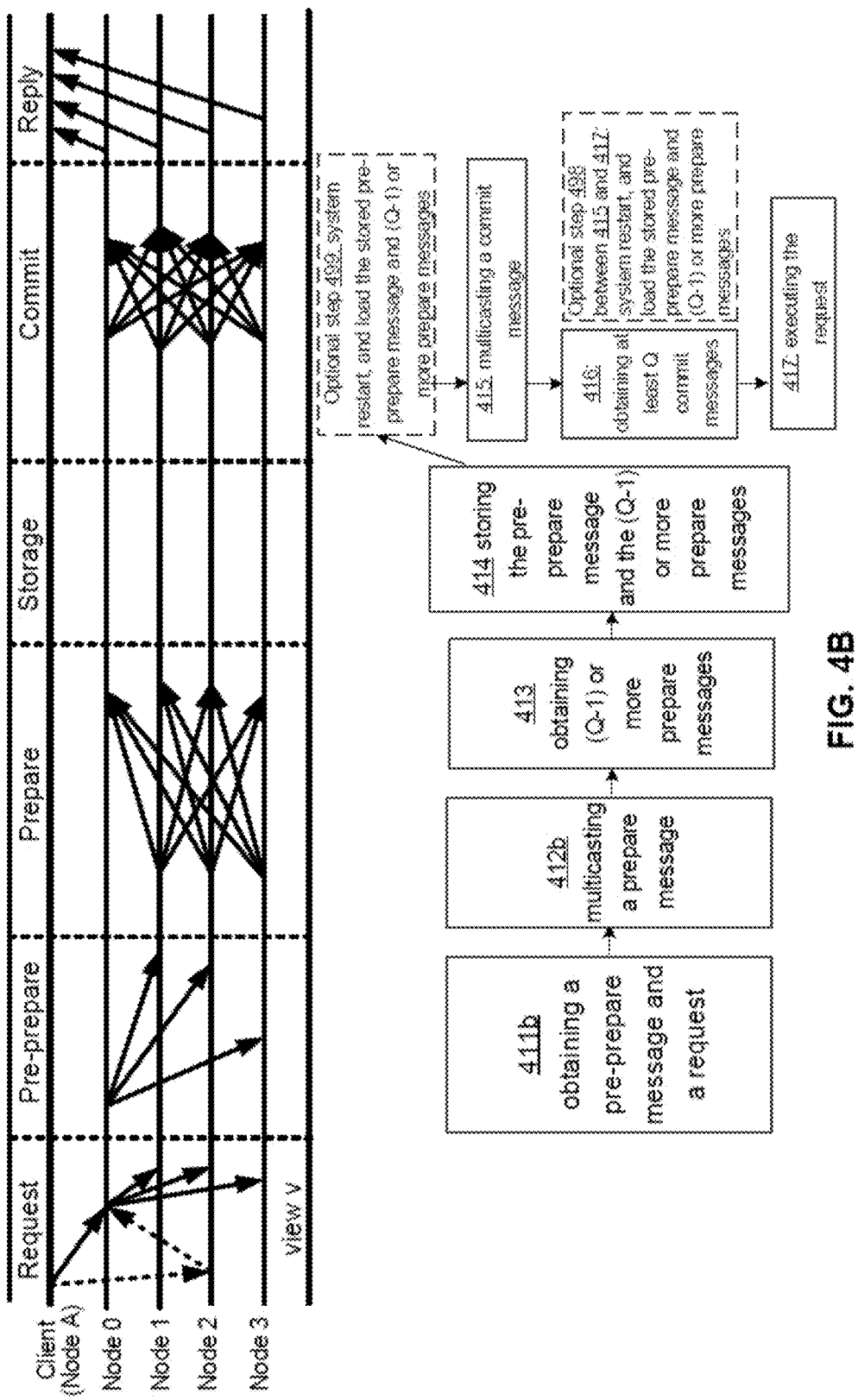

FIG. 4A illustrates a flowchart of consensus steps 410a performed by a primary node, according to various embodiments of this specification. FIG. 4B illustrates a flowchart of consensus steps 410b performed by a backup node, according to various embodiments of this specification. The two figures show a blockchain system implementing the PBFT consensus mechanism where at least 3F+1 nodes are included. However, the present specification is not limited to this. The blockchain system may have other number of nodes than "at least 3F+1", as long as there are a quorum of nodes in the system to maintain a valid consensus process and satisfy the safety and liveness requirements. In some embodiments, the consensus steps 410a are performed by a primary node in view v as shown in FIG. 4A, and the consensus steps 410b are performed by a backup node in view v as shown in FIG. 4B, without triggering a view change. The view indicates which of the N nodes is regarded as the primary node, where N designates the number of the nodes in the network system. The steps 410a and 410b may be each implemented by one or more components of the system 100 of FIG. 1 (e.g., Node 0, Node 1, Node 2, . . . , or Node i described above or a similar device, or a combination of any of the nodes and an additional device (e.g., node A)). In this figure, Node A (e.g., a lightweight node described above) is the client, and Node 0 to Node 3 are nodes in the network system 112. In the current view v, Node 0 acts as the primary node and Nodes 1 to 3 act as backup nodes. The steps 410*a* and 410*b* may be each implemented by a consensus system or device (e.g., computer, server) comprising various hardware machine and/or software. For example, the consensus system or device may comprise one or more processors and one or more non-transitory computer-readable storage media (e.g., one or more memories) coupled to the one or more processors, and configured with instructions executable by the one or more processors to cause the system or device (e.g., the processor) to perform the steps 410*a* or 410*b*. The operations presented below are intended to be illustrative. Depending on the implementation, the operations may include additional, fewer, or alternative steps performed in various orders or in parallel.

In the vertical direction of the FIGS. 4A and 4B, the various steps correspond to the "Request," "Pre-Prepare," "Prepare," "Storage," "Commit," and "Reply" phases, which may be referred to the descriptions above with reference to FIG. 1 to FIG. 3C. The arrangement of various phases is shown for clarity, and may not have strict sequence requirements. For example, the Storage phase may begin before the Prepare phase ends, and/or end after the Commit phase begins. As shown in FIG. 4A, for example, the optional step 498 may be additionally performed between step 415 and step 417, when a disruption (e.g., downtime situation) takes place, as described below. The primary node and backup nodes may be those defined in the PBFT consensus mechanism.

The steps 410*a* of FIG. 4A and the steps 410*b* of FIG. 4B may be applied to one round of consensus verification of one or more requests. For example, one round of consensus verification may process one or more transaction requests. If successful, the corresponding transactions are packed into a new block of the blockchain. The description below refers to either FIG. 4A or FIG. 4B as certain steps are intertwined, unless specifically indicated. Steps 411*a* and 412*a* are found in FIG. 4A only, while steps 411*b* and 412*b* are found in FIG. 4B only. Steps 413, 414, 415, 416, and 417 are shown in both FIG. 4A and FIG. 4B.

At step 411*a*, as shown in FIG. 4A, in the Request phase, the primary node may obtain a request from a client. For example, the request may be directly obtained by the primary node (Node 0) from the client (Node A) or from a backup node (e.g., backup Node 1, 2, or 3) which forwarded the request to the primary node, as shown by dash lines. In some embodiments, the request may involve a transaction/transactions (with or without a smart contract) for consensus verification. The consensus verification may be performed during execution of the normal operation protocol. Alternatively, the requests may correspond to other operations.

At step 412*a*, in the Pre-prepare phase, the primary node (Node 0) multicasts a pre-prepare message together with the request to the backup nodes (Nodes 1, 2 and 3). In some embodiments, after obtaining multiple requests, the primary node may multicast the pre-prepare message and the multiple requests to each of the backup nodes. The pre-prepare message may include an order for the requests (e.g., an order for transactions associated with the requests).

As shown in FIG. 4B, which illustrates the steps performed by a backup node (e.g., Node 1, 2 or 3) under the normal operation protocol, the backup node obtains a pre-prepare message together with a request in the Pre-prepare phase at step 411*b*. The request may include associated transactions for consensus verification. In some embodiments, the pre-prepare message and the request may be obtained from the primary node. In some embodiments, the pre-prepare message may be obtained from the primary node, and the request may be obtained from the client, the primary node, and/or any other backup node. If the primary node is non-functioning, the view change protocol may be triggered.

At step 412*b*, in the Prepare phase, the backup node multicasts a prepare message to other nodes in the system, if pre-prepare message is valid.

At step 413, in the Prepare phase, the primary node or the backup node receives prepare messages sent from other nodes. Obtaining (Q-1) valid prepare messages may be a condition to be met before the consensus process enters into the next Commit phase. In the embodiments shown in FIGS. 4A and 4B, for example, (Q-1) is 2F, and 2F or more prepare messages are required. The 2F or more prepare messages may include the backup or primary node's own prepare message. For a backup node, the 2F or more prepare messages may include the prepare message at step 412*b* (that is, the prepare message multicast by the backup node itself at step 412*b*).

At step 414, the primary or backup node may store the pre-prepare message and at least (Q-1) prepare messages. For example, if a number of 3F prepare messages are obtained by a node, the pre-prepare message and a number of prepare messages between 2F and 3F inclusive may be stored by the node. In some embodiments, only the pre-prepare message and Q-1 prepare messages are stored. In some embodiments, only the pre-prepare message and the 2F prepare messages are stored. For example, if 3F prepare messages are obtained, the pre-prepare message and 2F prepare messages may be the minimal amount of consensus messages that need to be stored for a valid consensus process to be effectively and efficiently resumed and advanced after the whole system recovers from a disruption (e.g., a system crash), without consuming too much system storage resource. In some embodiments, storing the pre-prepare message and the (Q-1) or more prepare messages comprises: storing only the pre-prepare message and the (Q-1) or more prepare messages, which means that no message other than the pre-prepare message and the at least 2F prepare messages is stored. For example, for each round of consensus-verification, commit messages are not stored. The same may apply when multiple rounds of consensus verifications are performed.

Step 413 and step 414 may be performed in sequence, simultaneously, or in another manner. In some embodiments, storage of the pre-prepare message and the at least (Q-1) prepare messages may be performed only when (Q-1) or more prepare messages are obtained. In other embodiments, the storage of the pre-prepare message and the at least (Q-1) prepare messages may be performed any time after the respective message is obtained.

In some embodiments, the pre-prepare message and the at least (Q-1) prepare messages may be stored in various manners as long as the stored messages are retrievable after system recovers from the disruption. For example, the pre-prepare message and the at least (Q-1) prepare messages may be stored in a persistent storage which ensures that the storage is unaffected by system crashes and restarts.

In some embodiments, if there is no disruption (e.g., downtime caused by a system crash) to the system operation, step 415 may be performed. In one embodiment, the Commit phase at step 415 is performed after at least the pre-prepare message and the (Q-1) prepare messages are stored. For step 415, in the Commit phase, the primary node and the backup nodes each multicasts a commit message to other nodes. Each node may also receive commit messages multicast by other nodes. At step 416, the primary or backup node may obtain at least a quorum (Q) of commit messages (in this case, 2F+1). For the backup or primary node, as shown in FIGS. 4A and 4B, the Q commit messages may include the commit message at step 415 (that is, the commit message multicast by the backup or primary node itself at step 415). At step 417, if a node sees enough nodes (e.g., Q nodes) have committed, the node may execute the request according to the order and notify the client (Node A) via a reply message.

In some embodiments, if there is a disruption (e.g., downtime caused by a system crash) to the system operation after a commit message is multicast, an optional step 498 may be performed after step 415 and before step 417. At step 498, the primary or backup node may perform a system restart, and load the pre-prepare message and the at least (Q-1) prepare messages that the node once stored at the step 414. In some embodiments, the system may restart after the disruption, either voluntarily or involuntarily. Then, the rest steps 416 to 417 or step 417 may follow.

In some embodiments, if there is a disruption (e.g., downtime caused by a system crash) to the system operation before the commit message is multicast, an optional step 499 may be performed after step 414 and before step 415. At step 499, the primary or backup node may load the pre-prepare message and the at least (Q-1) prepare messages it once stored in the storage phase (step 414). In some embodiments, the system may restart after the disruption, either voluntarily or involuntarily. If step 499 is performed, the view change protocol may be triggered under certain circumstances (for example, if the non-functioning node is the primary node, and the primary node does not resume its functioning status within the timeout period). However, if the timeout condition is not met (e.g., the step 499 is completed before triggering the timeout condition), the view change protocol may not be triggered, as shown in FIG. 4A and FIG. 4B. Thus, the view change protocol may not be triggered if the non-functioning primary node resumes its functioning state quickly enough to avoid the timeout condition, and steps 415 to 417 may follow in the protocol. If the timeout condition is met (e.g., the step 499 is not completed before the timeout condition is triggered), the view change protocol may be triggered as described below with reference to FIG. 4C and FIG. 4D.

Figure 4C:
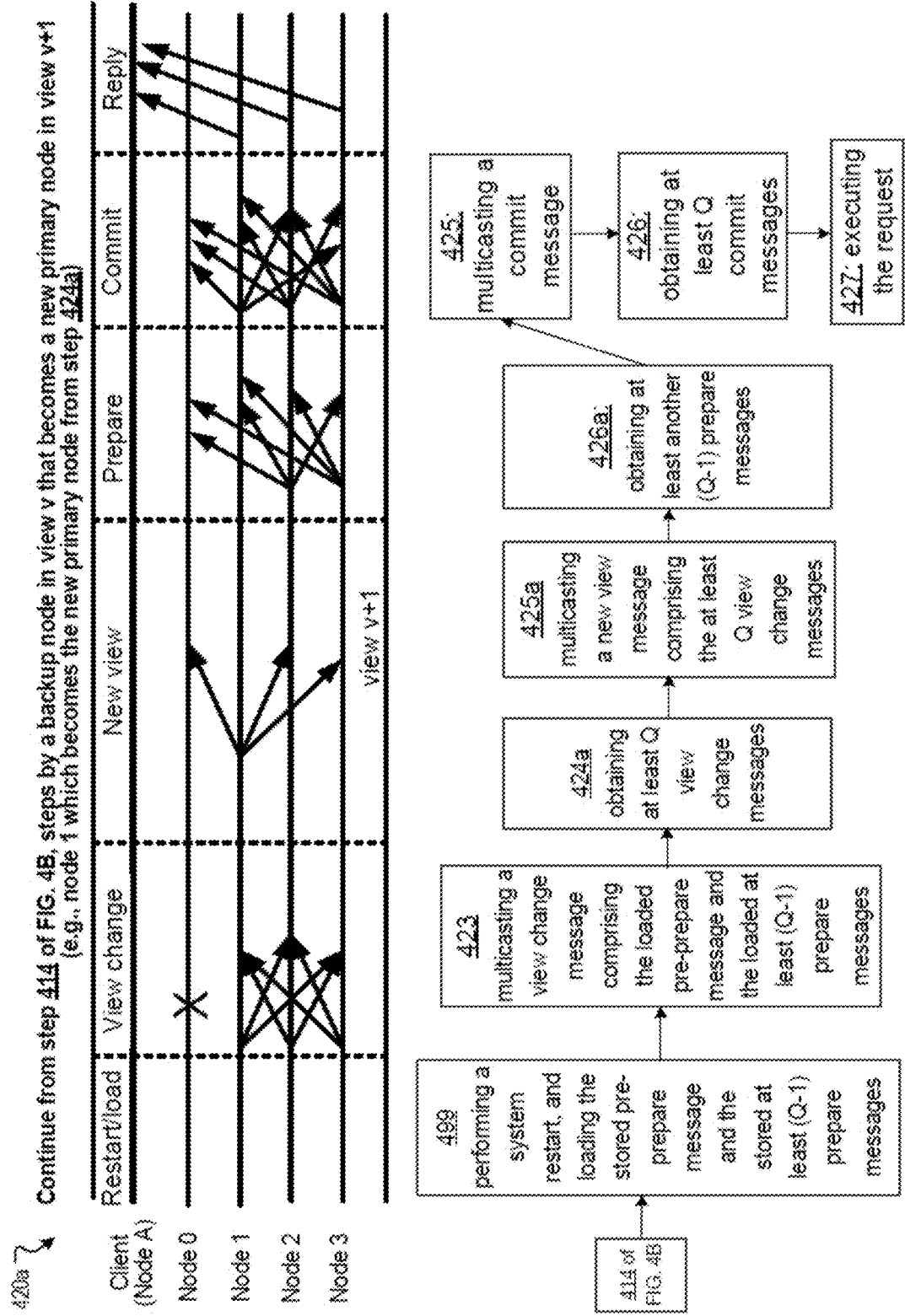
Figure 4D:
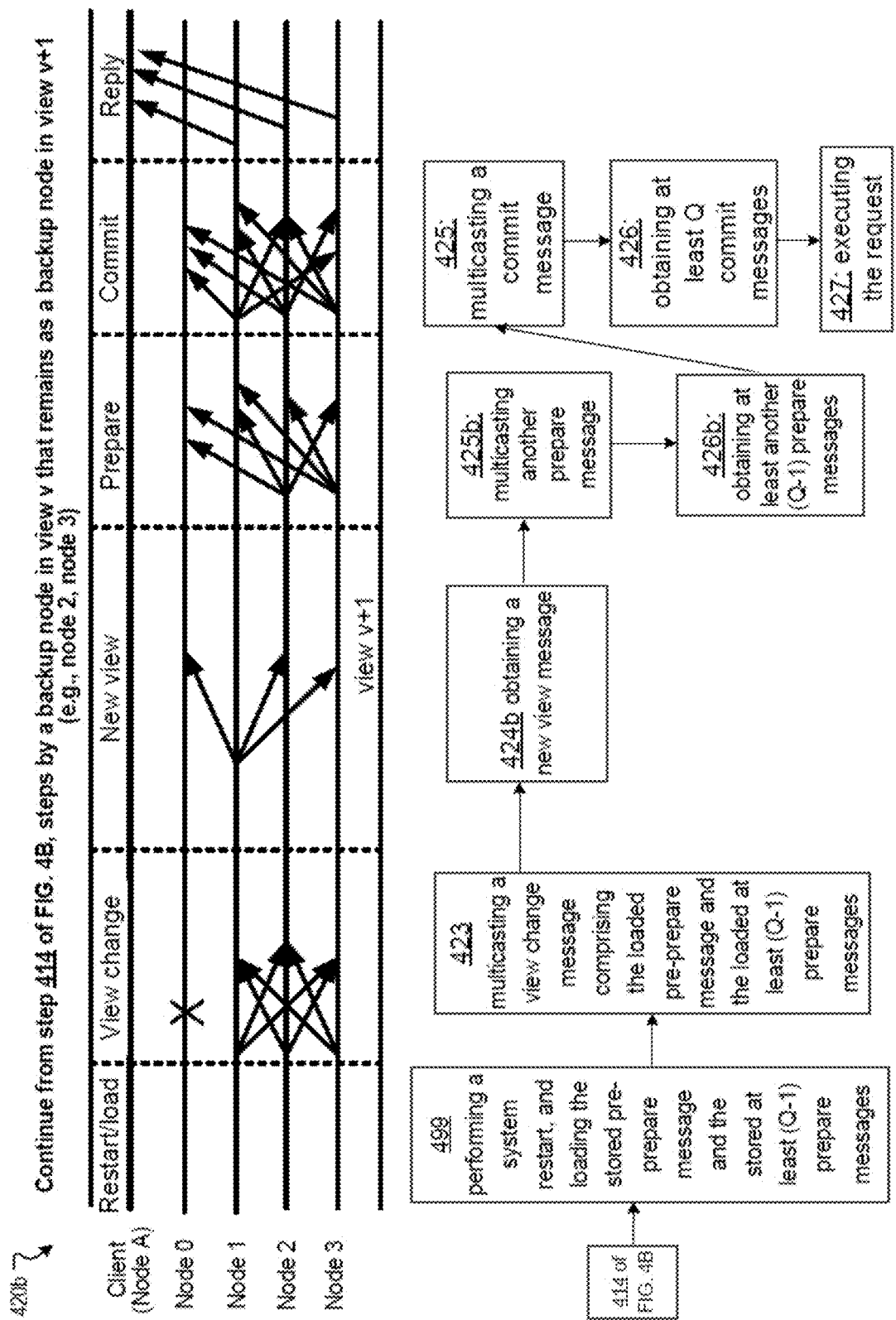

FIG. 4C illustrates a flowchart of consensus steps 420a by a backup node in view v that becomes a new primary node in view v+1, according to various embodiments of this specification. FIG. 4D illustrates a flowchart of consensus steps 420b by a backup node in view v that remains as a backup node in view v+1, according to various embodiments of this specification. The steps 420a and 420b may be implemented by one or more components of the system 100 of FIG. 1 (e.g., Node 0, Node 1, Node 2, . . . , or Node i described above or a similar device, or a combination of any of the nodes and an additional device (e.g., Node A)). In this figure, Node A (e.g., a lightweight node described above) is a client, and Node 0 to Node 3 are blockchain nodes. As described in FIG. 4A and FIG. 4B, in view v, Node 0 acted as the primary node, but for view v+1 in FIG. 4C and FIG. 4D, Node 1 becomes a new primary node, with Nodes 2 to 3 remain as backup nodes. The steps 420a and 420b may be each implemented by one or more nodes of the distributed network system (e.g.,, a blockchain system). The steps 420a and 420b may be each implemented by a consensus system or device (e.g., computer, server) comprising various hardware machine and/or software. For example, the consensus system or device may comprise one or more processors and one or more non-transitory computer-readable storage media (e.g., one or more memories) coupled to the one or more processors and configured with instructions executable by the one or more processors to cause the system or device (e.g., the processor) to perform the steps 420a and 420b. The operations presented below are intended to be illustrative. Depending on the implementation, the operations may include additional, fewer, or alternative steps performed in various orders or in parallel.

As described above, if the view change is triggered after the step 414 and before the step 415 of FIG. 4B, steps shown in FIG. 4C and FIG. 4D are performed. For brevity, the steps before the step 499 (steps up till step 414 shown in FIG. 4B) are not reproduced in FIG. 4C and FIG. 4D.

In some embodiments, the consensus steps 420a and 420b as shown in FIG. 4C and FIG. 4D may correspond to the situation of triggering view change. The primary node in view v (e.g., Node 0) may become faulty or otherwise non-functioning. For FIG. 4C, a backup node as in view v (e.g., Node 1) that becomes a new primary node in view v+1 may perform steps 499, 423, 424a, 425a, 426a, 425, 426, and 427. A backup node in view v (e.g., Node 2 or 3) that remains as a backup node in view v+1 may perform steps 499, 423, 424b, 425b, 426b, 425, 426, and 427. In the vertical direction of the two figures, the various steps correspond to the "View-Change," "New-View," "Prepare," "Commit," and "Reply" phases, which may be referred to the descriptions above with reference to FIG. 1 to FIG. 3C. The arrangement of various phases is shown for clarity and may not have strict sequence requirements. The primary node and backup nodes may be those defined in the PBFT consensus mechanism. The descriptions below refer to either FIG. 4C or FIG. 4D as certain steps are intertwined.

In some embodiments, as shown at step 499, still in view v, the primary node (Node 0) and some of the backup nodes (Node 1, 2, and/or 3) may each load the Pre-prepare message and the at least (Q-1) prepare messages that are respectively stored at the step 414. If the messages were stored from a persistent storage, they may be now loaded from the persistent storage. The system restart may be performed in response to a disruption to the normal operation (e.g., downtime caused by system crash).

In one embodiment, on suspicion that the primary node may be non-functioning, a backup node (e.g. Node 1, 2 or 3) may multicast a view change message, which may comprise the loaded pre-prepare message and the loaded at least (Q-1) prepare messages, as shown in step 423. Under the view change protocol, one of the backup nodes may become a new primary node, and the rest may remain as backup nodes. The selection of the new primary node is described above. For example, as shown, Node 1 may be elected to be the new primary node, while Nodes 2 and 3 may remain as backup nodes.

At step 424a, when a backup node has obtained at least Q view change messages from other nodes each indicating that the corresponding node agrees to the view change message, a new primary node may be selected (e.g., Node 1). The at least Q view change messages may include the view change message multicast by the backup node per se. At step 425a, the new primary node (e.g., Node 1) multicasts to at least some of the backup nodes a new view message comprising the at least Q view change messages.

As shown in FIG. 4D, at step 424b, in the process under the view change protocol, a backup node may obtain from the new primary node a new view message indicating that the new primary node has received Q or more view change messages each indicating that the corresponding node agrees to the view change message. At step 425b, the backup node multicasts another prepare message indicating an acceptance of the new view message. The another prepare message may differ from the prepare message of FIG. 4A and FIG. 4B at least in terms of the view number.

Referring to FIG. 4C, at step 426a, the new primary node (Node 1) may obtain another (Q-1) or more prepare messages. At step 426b, the remaining backup nodes may each obtain another (Q-1) or more prepare messages. The prepare phase of FIG. 4C and FIG. 4D is similar to the prepare phase of FIG. 4A and FIG. 4B, except that the prepare message contents may differ after view change and some nodes may have committed some of the requests. To distinguish, the prepare message for the prepare phase of FIG. 4C and FIG. 4D is referred to as another prepare message or another quantity of prepare messages.

Steps 425 to 427 under the view change protocol are similar to steps 415 to 417 under the normal operation protocol, but may differ in the following aspects: (1) the view number, (2) committed requests do not need to be re-committed at the corresponding node, (3) that the non-functioning Node 0 may not perform the steps 425 to 427, or not honestly perform the steps 425 to 427.

The disclosed methods can ensure proper functions of the blockchain system with less demand for storage consumption. In one example, in a blockchain system with a total number of at least 3F+1 nodes, when at least F+1 nodes have multicast the commit messages, it means that at least 2F+1 nodes have prepared, and the pre-prepare message and the at least 2F prepare messages are in persistence. In some embodiments, the pre-prepare message and the at least 2F prepare messages are stored by the respective nodes in the Storage phase. For example, the primary node and/or some backup nodes have stored the pre-prepare message and the prepare messages. As such, even if one or more or at worst all nodes experience a system crash and restart, unlike the process without the Storage phase, the prep-prepare message and the at least 2F messages once stored at the storage phase are loaded. As a result, even if there are F nodes (that may or may not have multicast the commit messages) who do not restart and resume functionality, since the pre-prepare message and the at least 2F messages are stored and loaded, the whole consensus verification process can be effectively resumed and advanced with less demand for storage consumption, and without being affected by the system crash that may otherwise cause inconsistency and/or branching or affect safety and/or liveness of the system.

In some embodiments, if the primary node is not among the nodes that restarted, view change may be triggered if the timeout period ends. Because at least Q nodes have prepared and even if F of them have committed and do not perform the restart, (Q-F) nodes may perform the system restart and load the stored pre-prepare and prepare messages. The view change message multicast by the restarted (Q-F) nodes would carry the pre-prepare and prepare messages from before the crash, which ensures that the new view message multicast by the new primary node will carry the same. Thus, inconsistent consensus results and blockchain branching are prevented.

In other embodiments, if the primary node is among the Q nodes that restarted, the primary node may try to resume the normal operation protocol or propose other operations. If the restart is not sufficiently fast, since at least (Q-F) nodes are locked by the loaded pre-prepare and prepare messages, they will not respond to the primary node. Accordingly, no consensus can be reached, and view change may be triggered to elect a new primary node. The rest may follow the above-described view change embodiments.

FIG. 5A illustrates a flowchart of a consensus method 510, according to various embodiments of this specification. The method 510 may be implemented by one or more components of the system 100 of FIG. 1 (e.g., Node 0, Node 1, Node 2, . . . , or Node i described above or a similar device, or a combination of any of the nodes and one or more additional devices (e.g., node A)). The method 510 may be implemented by one or more blockchain nodes (e.g., a backup node). The method 510 may be implemented by a consensus system or device (e.g., computer, server) comprising various hardware machine and/or software. For example, the consensus system or device may comprise one or more processors and one or more non-transitory computer-readable storage media (e.g., one or more memories) coupled to the one or more processors and configured with instructions executable by the one or more processors to cause the system or device (e.g., the processor) to perform the method 510. The operations of method 510 presented below are intended to be illustrative. Depending on the implementation, method 510 may include additional, fewer, or alternative steps performed in various orders or in parallel. The various blocks described below may not have to be executed in the sequence shown in the figure unless otherwise specified. For example, block 512 may start after block 513 is started and end before block 513 is ended. Similarly, block 515 may start after block 516 is started and end before block 516 is ended. For another example, blocks 513 and 514 may be performed in sequence or in parallel.

In some embodiments, the method 510 may be implemented on a blockchain maintained by a number (N) of nodes, wherein one of the nodes acts as a primary node and the other (N-1) nodes act as backup nodes, and the method 510 is performed by one of the backup nodes. N can be any integer no less than four. In some embodiments, N equals 3F+1, wherein F designates the number of non-functioning nodes that the system can tolerate in the PBFT consensus mechanism. The primary and backup nodes may be those defined in the PBFT consensus mechanism. The method 510 may be applied to one round of consensus verification for one or more requests (e.g., blockchain transaction requests). The steps of the method 510 may be performed by a backup node in a current view, which may remain as a backup node or become a new primary node in case a view change takes place. The view according to the PBFT consensus mechanism may or may not change during the implementation of the method 510. Further details of the method 510 can be referred to FIG. 1 to FIG. 4B and related descriptions above.

Block 511 includes obtaining a pre-prepare message from the primary node. In some embodiments, before obtaining the pre-prepare message from the primary node, the method 510 further comprises obtaining one or more transaction requests from at least one of: one or more clients, the primary node, or one or more of the other backup nodes. The transaction in the term "transaction request" may be implemented via a blockchain system and recorded to the blockchain. The transaction may include, for example, a financial transaction, a blockchain contract transaction for deploying or invoking a blockchain contract, a transaction that updates a state (e.g., world state) of the blockchain, etc. The transaction does not have to involve a financial exchange. The transaction requests may comprise blockchain transactions to be added to the blockchain via consensus verification. In one embodiment, the pre-prepare message comprises an order of one or more transactions corresponding to the one or more transaction requests. The order may be proposed by the primary node which multicast the pre-prepare message for executing the transaction requests. The order may correspond to a unique hash value identification of a proposed new block containing the transactions. The primary node and the backup nodes will verify the proposed order and try to reach a consensus. Alternatively, the request may comprise another instruction to one or more computing devices to provide information or perform another function.

Block 512 includes multicasting a prepare message to at least some of the primary node and the other (N-2) backup nodes, the prepare message indicating an acceptance of the pre-prepare message. Multicast means broadcast to one or more or all of the other nodes in the PBFT system. Each functioning backup node may multicast the prepare message.

Block 513 includes obtaining (Q-1) or more prepare messages respectively from (Q-1) or more of the backup nodes, wherein Q (quorum) is (N+F+1)/2 rounded up to the nearest integer, and F is (N-1)/3 rounded down to the nearest integer. For example, the node performing the method 510 is one of the N nodes. The (Q-1) prepare messages may be from distinct nodes and are valid and consistent, which indicates that at least (Q-1) backup nodes and the primary node agree to the pre-prepare message.

Block 514 includes storing the pre-prepare message and the (Q-1) or more prepare messages. For example, if (Q-1) is 2F and if 3F prepare messages are obtained in the previous step, here, the pre-prepare message and a number of prepare messages between 2F and 3F inclusive may be stored. In some embodiments, only the pre-prepare message and the (Q-1) prepare messages are stored. For example, if (Q-1) is 2F and if 3F prepare messages are obtained in the previous step, here, only the pre-prepare message and 2F prepare messages may be stored. In some embodiments, storing the pre-prepare message and the (Q-1) or more prepare messages comprises: storing only the pre-prepare message and the (Q-1) or more prepare messages. For example, only the pre-prepare message and the (Q-1) prepare messages are stored. No message other than the pre-prepare message and the (Q-1) or more prepare messages is stored. For example, for each round of consensus-verification, commit messages are not stored. The same may apply when multiple rounds of consensus verifications are performed.

In some embodiments, the pre-prepare message and the at least (Q-1) prepare messages may be stored in various manners as long as the stored data is retrievable after system downtime recovery, such as a system restart. For example, the pre-prepare message and the (Q-1) or more prepare messages may be stored in a relational database, a non-relational database, a document system, etc. For example, the pre-prepare message and the (Q-1) or more prepare messages may be stored in a persistent storage. The storage step and other steps described herein may not be limited by the programming language.

In some embodiments, block 514 may be performed only when block 513 is satisfied, that is, only when (Q-1) or more prepare messages are obtained. In other embodiments, each pre-prepare or prepare message may be stored as soon as received.

In some embodiments, after storing the pre-prepare message and the (Q-1) or more prepare messages (block 514) and before multicasting the commit message (block 515), the method further comprises: performing a system restart; and loading the stored pre-prepare message and the stored (Q-1) or more prepare messages. The system restart may be performed in response to a disruption to normal operation (e.g., system crash, power outage, etc.). The disruption may happen to one or more or all of the nodes in the PBFT system. In some embodiments, up to all of the N nodes experience a crash, and at least Q of the N nodes perform the system restart and load the corresponding stored pre-prepare message and the stored (Q-1) or more prepare messages respectively. Next, the view change protocol may or may not be triggered.

In one embodiment, the view change protocol may not be triggered if the restart is quick enough to avoid triggering the timeout, and thus the system restart avoids triggering the view change. That is, performing the system restart comprises: performing the system restart without triggering a view change. Accordingly, the rest of the steps of the method 510 from block 515 may follow.

Otherwise, the view change protocol may be triggered. In one embodiment, after storing the pre-prepare message and the (Q-1) or more prepare messages and before multicasting the commit message, the method further comprises: multicasting a view change message comprising the loaded pre-prepare message and the loaded (Q-1) or more prepare messages. Other backup nodes may also multicast the view change message. One of the backup nodes may be elected to become a new primary node, which may or may not be the one backup node that performed the preceding steps.

In some embodiments, if the backup node that performed the above steps is not elected to be a new primary node, it may remain as the backup node and perform the following steps during the view change. After storing the pre-prepare message and the (Q-1) or more prepare messages and before multicasting the commit message, the method further comprises: obtaining from a new primary node a new view message indicating that the new primary node has received Q or more view change messages each indicating that the corresponding node agrees to the view change message; multicasting another prepare message to at least some of the backup nodes including the new primary node, the another prepare message indicating an acceptance of the new view message; and obtaining another (Q-1) or more prepare messages respectively from (Q-1) or more of the backup nodes, wherein the another (Q-1) or more prepare messages include the multicast another prepare message.

In other embodiments, if the node that performed the above steps is elected to be the new primary node, it may become the new primary node and perform the following steps during the view change. After storing the pre-prepare message and the (Q-1) or more prepare messages and before multicasting the commit message, the method further comprises: obtaining, respectively from Q or more of the backup nodes, Q or more view change messages each indicating that the corresponding node agrees to the view change message, wherein the Q or more view change messages include the multicast view change message; multicasting to at least some of the backup nodes a new view message indicating that the one backup node acting as a new primary node has received the Q or more view change messages; and obtaining another (Q-1) or more prepare messages respectively from (Q-1) or more of the backup nodes, wherein the another (Q-1) or more prepare messages include the another multicast prepare message.

Blocks 515 and 516 and following steps may be performed while in the same view as blocks 511-514 if no view change takes place, or in a new view if view change takes place before block 515.

Block 515 includes multicasting a commit message to at least some of the primary node and the other backup nodes, the commit message indicating that the one backup node agrees to the (Q-1) or more prepare messages. In some embodiments, the commit message indicates that the one backup node agrees to the pre-prepare message and has obtained the (Q-1) or more prepare messages. In some embodiments, verification steps may be performed for agreeing to multicast the commit message. For example, as described above, digest D(m) may be determined according to the order to verify against digest d. If consistent, the commit message may be multicast.

In some embodiments, up to F of the (Q-1) or more of the backup nodes in block 513 are faulty or otherwise non-functioning after multicasting the commit messages respectively and do not perform the system restart. For example, the F nodes that have committed may experience a system crash and do not restart to resume function. Despite that, the consensus verification can be properly carried out without causing inconsistent results and branching to the blockchain.

Block 516 includes obtaining, respectively from Q or more nodes among the primary node and the backup nodes, Q or more commit messages each indicating that the corresponding node agrees to (Q-1) or more prepare messages received by the corresponding node. In some embodiments, the commit message indicates that the corresponding node that multicast the commit message agrees to the pre-prepare message and has obtained (Q-1) or more prepare messages. The Q commit messages may be from distinct nodes and are valid and consistent, which indicates that Q nodes are prepared to execute the requests in the order. Thus, a consensus is reached by a majority of the nodes, and the next execution step can be performed.

In some embodiments, after multicasting the commit message (block 515) and before executing the requests, the method further comprises: performing a system restart, and loading the stored pre-prepare message and the stored (Q-1) or more prepare messages. The system restart may be performed voluntarily or involuntarily. The system restart may be caused by a disruption to the system or device function, such as a system crash.

In some embodiments, the method 510 may further include packing the one or more transactions into a local copy of the blockchain maintained by the one backup node according to the order. For example, the requests may be consensus-verified as at least (Q-F) honest nodes (Q commit messages but accounting for at most F non-functioning nodes) have verified the digest d in their commit messages (or for the primary node, it may not have to perform the verification since it proposed the digest d). As a result, if enough nodes have verified the corresponding transactions, the transactions can be packed into the blockchain. The client(s) (e.g., node A) that originally sent the request(s) may be notified.

FIG. 5B illustrates a flowchart of a consensus method 520, according to various embodiments of this specification. The method 520 may be implemented by one or more components of the system 100 of FIG. 1 (e.g., Node 0, Node 1, Node 2, . . . , or Node i described above or a similar device, or a combination of any of the nodes and one or more additional devices (e.g., node A)). The method 520 may be implemented by one or more blockchain nodes (e.g., a primary node). The method 520 may be implemented by a consensus system or device (e.g., computer, server) comprising various hardware machine and/or software. For example, the consensus system or device may comprise one or more processors and one or more non-transitory computer-readable storage media (e.g., one or more memories) coupled to the one or more processors and configured with instructions executable by the one or more processors to cause the system or device (e.g., the processor) to perform the method 520. The operations of method 520 presented below are intended to be illustrative. Depending on the implementation, method 520 may include additional, fewer, or alternative steps performed in various orders or in parallel. The various blocks described below may not have to be executed in the sequence shown in the figure unless otherwise specified. For example, block 521 may start after block 522 is started and end before block 522 is ended. Similarly, block 524 may start after block 525 is started and end before block 525 is ended. For another example, blocks 522 and 523 may be performed in sequence or in parallel.

In some embodiments, the method 520 may be implemented on a blockchain maintained by a number (N) of nodes, wherein one of the nodes acts as a primary node and the other (N-1) nodes act as backup nodes, and the method 520 is performed by the primary node. The primary and backup nodes may be those defined in the PBFT model. The method 520 may be applied to one round of consensus verification for one or more requests (e.g., blockchain transaction requests). Further details of the method 520 can be referred to FIG. 1 to FIG. 4B and related descriptions above.

Block 521 includes multicasting a pre-prepare message to at least some of the backup nodes. In some embodiments, before multicasting the pre-prepare message to at least some of the backup nodes, the method 520 further comprises obtaining one or more transaction requests from at least one of: one or more clients (e.g., lightweight nodes) or one or more of the backup nodes. The transaction requests may comprises blockchain transactions to be added to the blockchain via consensus verification. In one embodiment, the pre-prepare message comprises an order of one or more transactions corresponding to the one or more transaction requests. The order may be proposed by the primary node which multicast the pre-prepare message for executing the transaction requests. The order may correspond to a unique hash value identification of a proposed new block containing the transactions. The primary node and the backup nodes will verify the proposed order and try to reach a consensus. Alternatively, the request may comprise another instruction to one or more computing devices to provide information or perform another function.

The blocks 522 to 525 may be similar to the blocks 513 to 516 and related descriptions above, except that if the primary node becomes non-functioning, view change is triggered and a new primary node is elected.

Block 522 includes obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer;. The backup nodes may have multicast the prepare messages respectively. In some embodiments, F represents a maximum number of non-functioning nodes allowed among the N nodes to keep a consensus system of the N nodes functioning. For example, the node performing the method 520 is one of the N nodes. The (Q-1) or more prepare messages may be from distinct nodes and are valid and consistent, which indicates that (Q-1) or more backup nodes and the primary node agree to the pre-prepare message.

Block 523 includes storing the pre-prepare message and the (Q-1) or more prepare messages. For example, if (Q-1) is 2F and if 3F prepare messages are obtained in the previous step, here, the pre-prepare message and a number of prepare messages between 2F and 3F inclusive may be stored. In some embodiments, only the pre-prepare message and the (Q-1) prepare messages are stored. For example, if (Q-1) is 2F and if 3F prepare messages are obtained in the previous step, here, only the pre-prepare message and 2F prepare messages may be stored. In some embodiments, storing the pre-prepare message and the (Q-1) or more prepare messages comprises: storing only the pre-prepare message and the (Q-1) or more prepare messages. For example, only the pre-prepare message and the (Q-1) prepare messages are stored. No message other than the pre-prepare message and the (Q-1) or more prepare messages is stored. For example, for each round of consensus-verification, commit messages are not stored. The same may apply when multiple rounds of consensus verifications are performed.

In some embodiments, the pre-prepare message and the (Q-1) or more prepare messages may be stored in various manners as long as the stored data is retrievable after system downtime recovery, such as a system restart. For example, the pre-prepare message and the (Q-1) or more prepare messages may be stored in a relational database, a non-relational database, a document system, etc. For example, the pre-prepare message and the (Q-1) or more prepare messages may be stored in a persistent storage. The storage step and other steps described herein may not be limited by the programming language.

In some embodiments, block 523 may be performed only when block 522 is satisfied, that is, only when (Q-1) or more prepare messages are obtained. In other embodiments, each pre-prepare or prepare message may be stored as soon as received.

In some embodiments, after storing the pre-prepare message and the (Q-1) or more prepare messages (block 523) and before multicasting the commit message (block 524), the method further comprises: performing a system restart; and loading the stored pre-prepare message and the stored (Q-1) or more prepare messages. The system restart may be performed in response to a disruption to normal operation (e.g., system crash, power outage, etc.). The disruption may happen to one or more or all of the nodes in the PBFT system. In some embodiments, up to all of the N nodes experience a crash, and at least Q of the N nodes perform the system restart and load the corresponding stored pre-prepare message and the stored (Q-1) or more prepare messages respectively. Next, the view change protocol may or may not be triggered.

In one embodiment, the view change protocol may not be triggered if the restart is quick enough to avoid triggering the timeout, and thus the system restart avoids triggering the view change. Accordingly, the rest of the steps of the method 520 from block 524 may follow. In another embodiments, the view change protocol may be triggered, and the rest of the steps of the method 520 from block 524 may not follow.

Block 524 includes multicasting a commit message to at least some of the backup nodes, the commit message indicating that the primary node agrees to the (Q-1) or more prepare messages. In some embodiments, the commit message indicates that the primary node has obtained the (Q-1) or more prepare messages. In some embodiments, up to F of the (Q-1) or more of the backup nodes in block 522 are faulty or otherwise non-functioning after multicasting the commit messages respectively and do not perform the system restart. For example, the F nodes that have committed may experience a system crash and do not restart to resume function. Despite that, the consensus verification can be properly carried out without causing inconsistent results and branching to the blockchain.

Block 525 includes obtaining, respectively from Q or more nodes among the primary node and the backup nodes, Q or more commit messages each indicating that the corresponding node agrees to the (Q-1 or more prepare messages received by the corresponding node, wherein the Q or more commit messages include the multicast commit message. In some embodiments, the commit message indicates that the corresponding node that multicast the commit message agrees to the pre-prepare message and has obtained (Q-1) or more prepare messages. The Q or more commit messages may be from distinct nodes and are valid and consistent, which indicates that Q or more nodes are prepared to execute the requests in the order. Thus, a consensus is reached by a majority of the nodes, and the next execution step can be performed.

In some embodiments, after multicasting the commit message (block 525) and before executing the requests, the method further comprises: performing a system restart, and loading the stored pre-prepare message and the stored (Q-1) or more prepare messages. The system restart may be performed voluntarily or involuntarily. The system restart may be caused by a disruption to the system or device function, such as a system crash.

In some embodiments, the method 520 may further include packing the one or more transactions into a local copy of the blockchain maintained by the primary node according to the order. For example, the requests may be consensus-verified as at least (Q-F) honest nodes (Q commit messages but accounting for at most F non-functioning nodes) have verified the digest d in their commit messages (or for the primary node, it may not have to perform the verification since it proposed the digest d). As a result, if enough nodes have verified the corresponding transactions, the transactions can be packed into the blockchain. The client(s) (e.g., node A) that originally sent the request(s) may be notified.

Figure 6A:
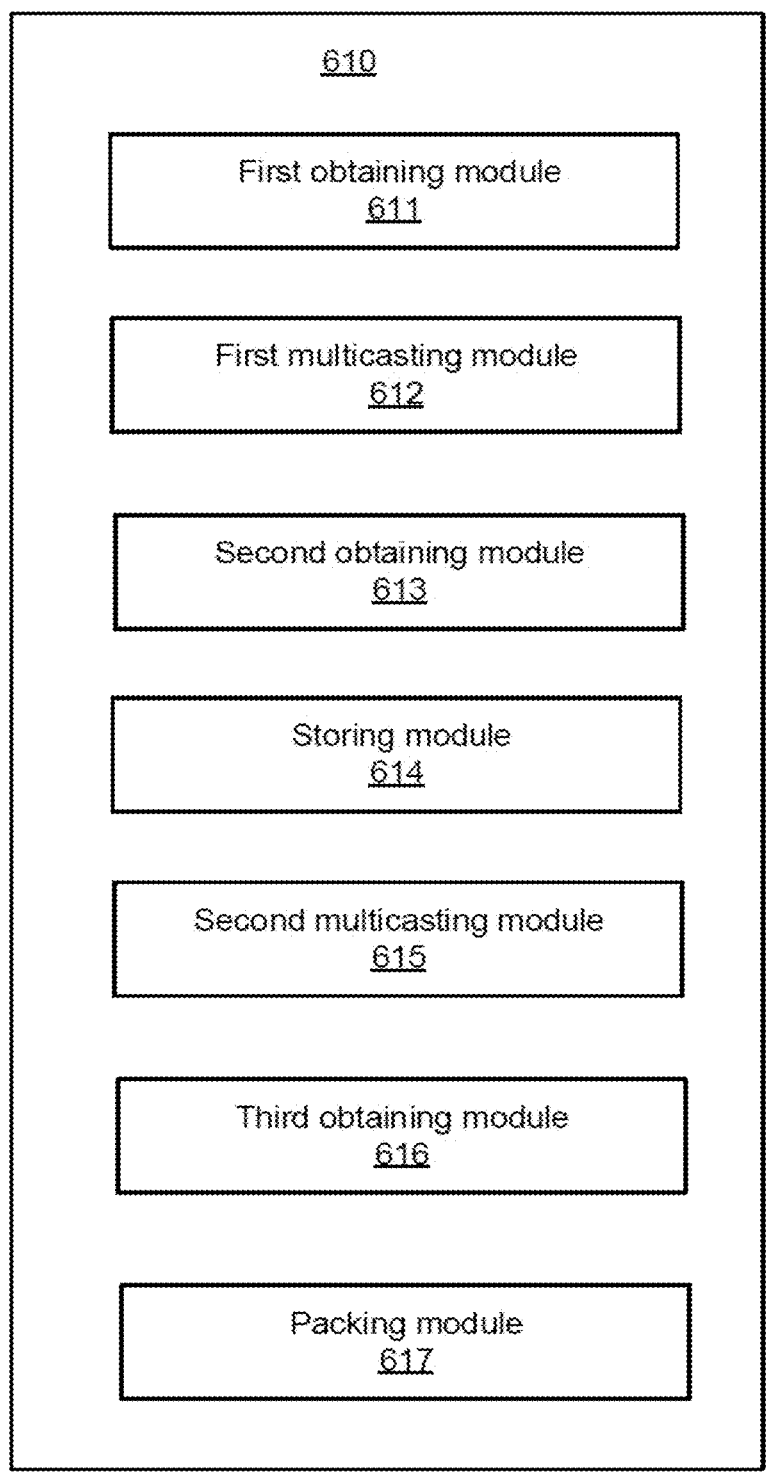
FIG. 6A illustrates a block diagram of a consensus system, in accordance with various embodiments.

FIG. 6A illustrates a block diagram of a consensus system 610, in accordance with various embodiments. The consensus system 610 (e.g., a computer system) may be an example of implementation of node 0, node 1, node 2, . . . , or node i described above or a similar device, or a combination of any of the nodes and an additional device (e.g., node A). The method 510 may be implemented by the consensus system 610. The consensus system 610 may comprise one or more processors and one or more non-transitory computer-readable storage media (e.g., one or more memories) coupled to the one or more processors and configured with instructions executable by the one or more processors to cause the system or device (e.g., the processor) to perform the method 510. The consensus system 610 may be implemented in a backup node. The consensus system 610 may comprise various units/modules corresponding to the instructions (e.g., software instructions).

In some embodiments, the consensus system 610 may be referred to as a consensus apparatus. The consensus apparatus may be for maintaining a blockchain, wherein a number (N) of nodes maintain the blockchain with one of the N nodes acting as a primary node and the other (N-1) nodes acting as backup nodes, the consensus apparatus acting as one of the (N-1) backup nodes and comprising one or more processors and one or more non-transitory computer-readable memories coupled to the one or more processors and configured with instructions executable by the one or more processors to cause the apparatus to perform operations. The consensus apparatus may comprise various units/modules corresponding to the instructions (e.g., software instructions). The consensus apparatus may comprise a first obtaining module 611 for obtaining a pre-prepare message from the primary node; a first multicasting module 612 for multicasting a prepare message to at least some of the primary node and the other (N-2) backup nodes, the prepare message indicating an acceptance of the pre-prepare message; a second obtaining module 613 for obtaining (Q-1) or more prepare messages respectively from (Q-1) or more of the backup nodes, wherein Q (quorum) is (N+F+1)/2 rounded up to the nearest integer, F is (N-1)/3 rounded down to the nearest integer, and the (Q-1) or more prepare messages include the multicast prepare message; a storing module 614 for storing the pre-prepare message and the (Q-1) or more prepare messages; a second multicasting module 615 for multicasting a commit message to at least some of the primary node and the other backup nodes, the commit message indicating that the one backup node agrees to the (Q-1) or more prepare messages; and a third obtaining module 616 for obtaining, respectively from Q or more nodes among the primary node and the backup nodes, Q or more commit messages each indicating that the corresponding node agrees to (Q-1) or more prepare messages received by the corresponding node, wherein the Q or more commit messages include the multicast commit message.

In some embodiments, the first obtaining module 611 or another module is also for obtaining one or more transaction requests from at least one of: one or more clients, the primary node, or one or more of the other backup nodes. The consensus apparatus may further comprise a packing module 617 for packing the one or more transactions into a local copy of the blockchain maintained by the one backup node according to the order.

Figure 6B:
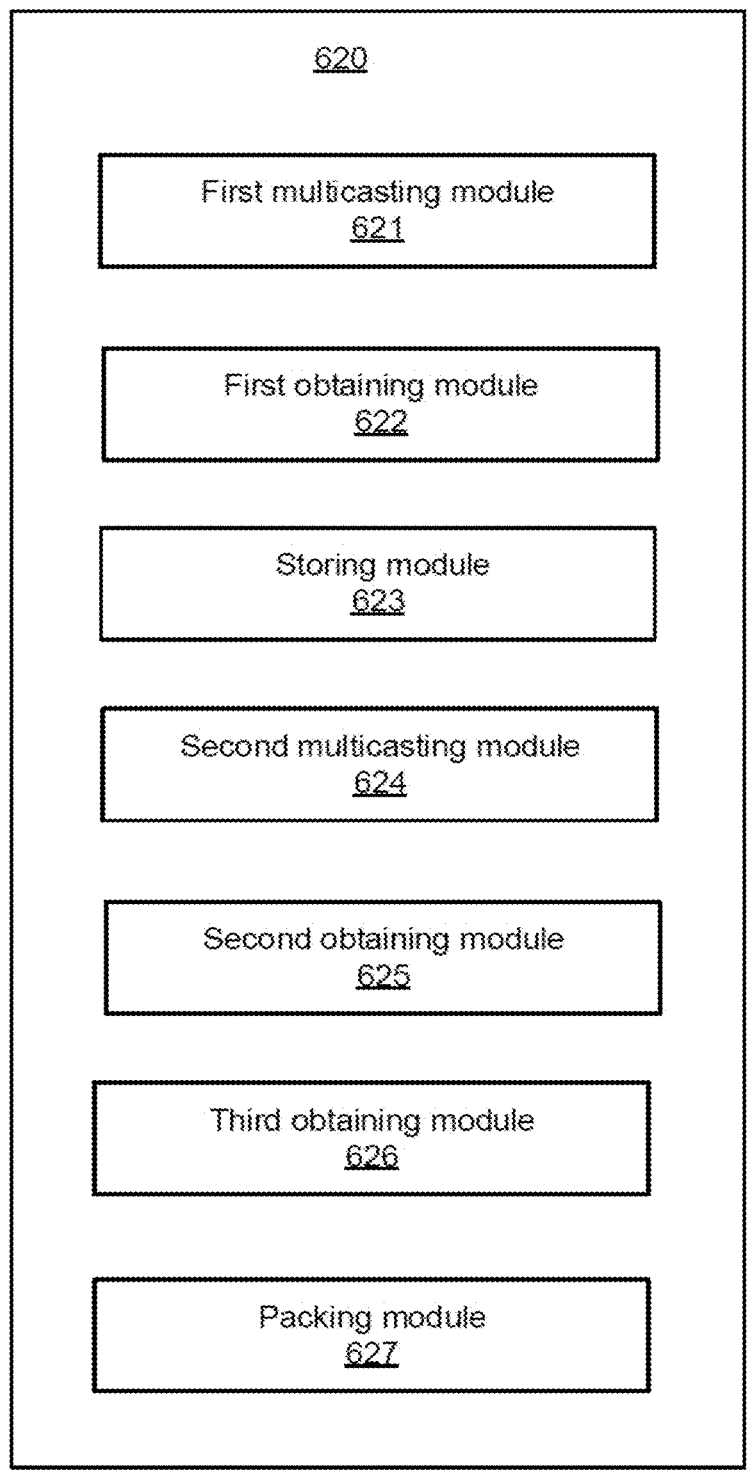
FIG. 6B illustrates a block diagram of a consensus system, in accordance with various embodiments.

FIG. 6B illustrates a block diagram of a consensus system 620, in accordance with various embodiments. The consensus system 620 (e.g., a computer system) may be an example of an implementation of node 0, node 1, node 2, . . . , or node i described above or a similar device, or a combination of any of the nodes and an additional device (e.g., node A). The method 520 may be implemented by the consensus system 620. The consensus system 620 may comprise one or more processors and one or more non-transitory computer-readable storage media (e.g., one or more memories) coupled to the one or more processors and configured with instructions executable by the one or more processors to cause the system or device (e.g., the processor) to perform the method 520. The consensus system 620 may be implemented in a primary node. The consensus system 620 may comprise various units/modules corresponding to the instructions (e.g., software instructions).

In some embodiments, the consensus system 620 may be referred to as a consensus apparatus. The consensus apparatus may be for maintaining a blockchain, wherein a number (N) of nodes maintain the blockchain with one of the N nodes acting as a primary node and the other (N-1) nodes acting as backup nodes, the consensus apparatus acting as the primary node and comprising one or more processors and one or more non-transitory computer-readable memories coupled to the one or more processors and configured with instructions executable by the one or more processors to cause the apparatus to perform operations. The consensus apparatus may comprise various units/modules corresponding to the instructions (e.g., software instructions). The consensus apparatus may comprise a first multicasting module 621 for multicasting a pre-prepare message to at least some of the backup nodes; a first obtaining module 622 for obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer; a storing module 623 for storing the pre-prepare message and the (Q-1) or more prepare messages; a second multicasting module 624 for multicasting a commit message to at least some of the backup nodes, the commit message indicating that the primary node agrees to the (Q-1) or more prepare messages; and a second obtaining module 625 for obtaining, respectively from Q or more nodes among the primary node and the backup nodes, Q or more commit messages each indicating that the corresponding node agrees to (Q-1) or more prepare messages received by the corresponding node, wherein the Q or more commit messages include the multicast commit message.

In some embodiments, the consensus apparatus may further comprise a third obtaining module 626 for obtaining one or more transaction requests from at least one of: one or more clients or one or more of the backup nodes. The consensus apparatus may further comprise a packing module 627 for packing the one or more transactions into a local copy of the blockchain maintained by the primary node according to the order.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 7:
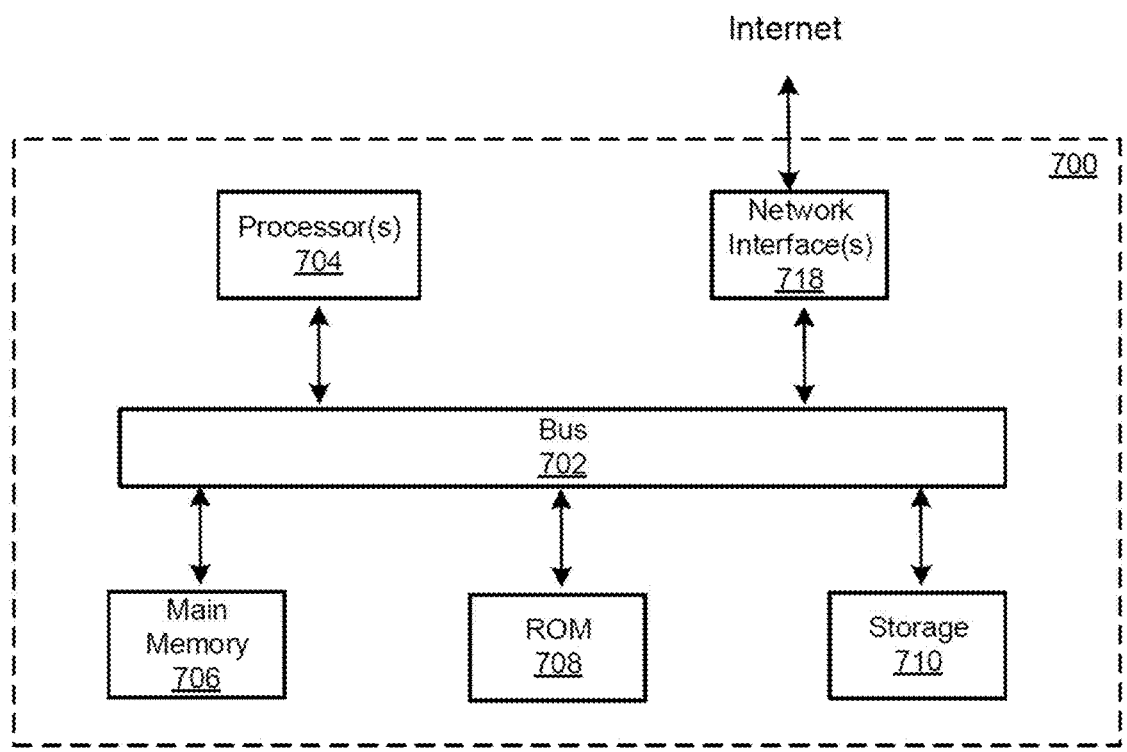
FIG. 7 illustrates a block diagram of a computer system in which any of the embodiments described herein may be implemented.

FIG. 7 is a block diagram that illustrates a computer system 700 upon which any of the embodiments described herein may be implemented. The system 700 may perform any of the methods described herein (e.g., the consensus method 510, the consensus method 520). The system 700 may be implemented in any of the systems described herein (e.g., the consensus system 610, the consensus system 620).

The system 700 may be implemented in any of the nodes described herein and configured to perform corresponding steps for implementing blockchain contract. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

Although an overview of the subject matter has been described with reference to specific embodiments, various modifications and changes may be made to these embodiments without departing from the broader scope of embodiments of the this specification. The Detailed Description should not to be taken in a limiting sense, and the scope of various embodiments is defined only by the appended claims, along with the full range of equivalents to which such claims are entitled.

The invention claimed is:

1. A computer-implemented consensus method to be implemented on a blockchain maintained by a number (N) of nodes, wherein one of the nodes acts as a primary node and the other (N-1) nodes act as backup nodes, and the method is performed by the primary node, the method comprising:
   multicasting a pre-prepare message to at least some of the backup nodes;
   obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer;
   storing at least a minimal amount of consensus messages for recovery after one or more of the N nodes crash, wherein the minimal amount of consensus messages comprise the pre-prepare message and at least (Q-1) of the (Q-1) or more prepare messages;
   after the one or more of the N nodes crash, loading at least the stored minimal amount of consensus messages;
   based on the loaded at least the stored minimal amount of consensus messages, multicasting a commit message to at least some of the backup nodes, the commit message indicating that the primary node agrees to the (Q-1) or more prepare messages; and
   obtaining, respectively from Q or more nodes among the primary node and the backup nodes, Q or more commit messages each indicating that a corresponding node of the Q or more nodes agrees to (Q-1) or more prepare messages received by the corresponding node.

2. The method of claim 1, wherein:
   before multicasting the pre-prepare message to at least some of the backup nodes, the method further comprises obtaining one or more transaction requests from at least one of: one or more clients or one or more of the backup nodes.

3. The method of claim 2, wherein:
   the pre-prepare message comprises an order of one or more transactions corresponding to the one or more transaction requests; and
   the commit message indicates that the primary node that sent the commit message agrees to the order.

4. The method of claim 3, further comprising:
   packing the one or more transactions into a local copy of the blockchain maintained by the primary node according to the order.

5. The method of claim 1, wherein:
   the Q or more commit messages include the multicast commit message.

6. The method of claim 1, wherein the minimal amount of consensus messages comprises:
   only the pre-prepare message and the at least (Q-1) of the (Q-1) or more prepare messages.

7. The method of claim 1, wherein storing at least the minimal amount of consensus messages comprises storing at least the minimal amount of consensus messages in a persistent storage.

8. The method of claim 1, wherein the crashed one or more of the N nodes comprise the primary node, and before loading at least the stored minimal amount of consensus messages, the method further comprises:
   in response to that the primary node crashes, performing a system restart.

9. The method of claim 8, wherein performing the system restart comprises:
   performing the system restart without triggering a view change.

10. A consensus system for maintaining a blockchain, wherein a number of N nodes maintain the blockchain with one of the N nodes acting as a primary node and the other (N-1) nodes acting as backup nodes, the consensus system acting as the primary node and comprising one or more processors and one or more non-transitory computer-readable memories coupled to the one or more processors and configured with instructions executable by the one or more processors to cause the system to perform operations comprising:
   multicasting a pre-prepare message to at least some of the backup nodes;
   obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer;
   storing at least a minimal amount of consensus messages for recovery after one or more of the N nodes crash, wherein the minimal amount of consensus messages comprise the pre-prepare message and at least (Q-1) of the (Q-1) or more prepare messages;
   after the one or more of the N nodes crash, loading at least the stored minimal amount of consensus messages;
   based on the loaded at least the stored minimal amount of consensus messages, multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that a corresponding node of the Q or more nodes agrees to (Q-1) or more prepare messages received by the corresponding node.

11. The system of claim 10, wherein:

before multicasting the pre-prepare message to at least some of the backup nodes, the operations further comprise obtaining one or more transaction requests from at least one of: one or more clients or one or more of the backup nodes;

the pre-prepare message comprises an order of one or more transactions corresponding to the one or more transaction requests;

the commit message indicates that the primary node that sent the commit message agrees to the order; and the operations further comprise packing the one or more transactions into a local copy of the blockchain maintained by the primary node according to the order.

12. The system of claim 10, wherein the minimal amount of consensus messages comprises:

only the pre-prepare message and the at least (Q-1) of the (Q-1) or more prepare messages.

13. The system of claim 10, wherein storing at least the minimal amount of consensus messages comprises storing at least the minimal amount of consensus messages in a persistent storage.

14. The system of claim 10, wherein the crashed one or more of the N nodes comprise the primary node, and before loading at least the stored minimal amount of consensus messages, the operations further comprise:

in response to that the primary node crashes, performing a system restart.

15. The system of claim 14, wherein performing the system restart comprises:

performing the system restart without triggering a view change.

16. A non-transitory computer-readable storage medium for maintaining a blockchain, wherein a number of N nodes maintain the blockchain with one of the N nodes acting as a primary node and the other (N-1) nodes acting as backup nodes, the storage medium being associated with the primary node and configured with instructions executable by one or more processors to cause the one or more processors to perform operations comprising:

multicasting a pre-prepare message to at least some of the backup nodes;

obtaining (Q-1) or more prepare messages respectively from (Q-1) or more of the backup nodes, wherein the prepare messages each indicate an acceptance of the pre-prepare message by the corresponding backup node, Q (quorum) is (N+F+1)/2 rounded up to the nearest integer, and F is (N-1)/3 rounded down to the nearest integer;

storing at least a minimal amount of consensus messages for recovery after one or more of the N nodes crash, wherein the minimal amount of consensus messages comprise the pre-prepare message and at least (Q-1) of the (Q-1) or more prepare messages;

after the one or more of the N nodes crash, loading at least the stored minimal amount of consensus messages;

based on the loaded at least the stored minimal amount of consensus messages, multicasting a commit message to at least some of the backup nodes, the commit message indicating that the primary node agrees to the (Q-1) or more prepare messages; and obtaining, respectively from Q or more nodes among the primary node and the backup nodes, Q or more commit messages each indicating that a corresponding node of the Q or more nodes agrees to (Q-1) or more prepare messages received by the corresponding node.

17. The storage medium of claim 16, wherein:

before multicasting the pre-prepare message to at least some of the backup nodes, the operations further comprise obtaining one or more transaction requests from at least one of: one or more clients or one or more of the backup nodes;

the pre-prepare message comprises an order of one or more transactions corresponding to the one or more transaction requests;

the commit message indicates that the primary node that sent the commit message agrees to the order; and the operations further comprise packing the one or more transactions into a local copy of the blockchain maintained by the primary node according to the order.

18. The storage medium of claim 16, wherein the minimal amount of consensus messages comprises:

only the pre-prepare message and the at least (Q-1) of the (Q-1) or more prepare messages.

19. The storage medium of claim 16, wherein storing at least the minimal amount of consensus messages comprises storing at least the minimal amount of consensus messages in a persistent storage.

20. The storage medium of claim 16, wherein the crashed one or more of the N nodes comprise the primary node, and before loading at least the stored minimal amount of consensus messages, the operations further comprise:

in response to that the primary node crashes, performing a system restart.

* * * * *